US008319178B2

(12) United States Patent
Murakami

(10) Patent No.: US 8,319,178 B2
(45) Date of Patent: Nov. 27, 2012

(54) MASS SPECTROMETRY APPARATUS AND METHOD USING THE APPARATUS

(75) Inventor: Naoki Murakami, Kanagawa-ken (JP)

(73) Assignee: Fujifilm Corporation (JP)

( * ) Notice: Subject to any disclaimer, the term of this patent is extended or adjusted under 35 U.S.C. 154(b) by 78 days.

(21) Appl. No.: 12/785,119

(22) Filed: May 21, 2010

(65) Prior Publication Data

US 2010/0294926 A1 Nov. 25, 2010

(30) Foreign Application Priority Data

May 22, 2009 (JP) ................................ 2009/123919

(51) Int. Cl.
H01J 49/16 (2006.01)
H01J 49/40 (2006.01)
(52) U.S. Cl. .................... 250/288; 250/287; 250/281
(58) Field of Classification Search .................. 250/281, 250/282, 287, 288
See application file for complete search history.

(56) References Cited

U.S. PATENT DOCUMENTS

| 2006/0157648 | A1  | 7/2006  | Siuzdak et al. |         |
|--------------|-----|---------|----------------|---------|
| 2008/0073512 | A1* | 3/2008  | Siuzdak et al. | 250/288 |
| 2008/0290272 | A1* | 11/2008 | Naya et al.    | 250/288 |
| 2009/0140137 | A1* | 6/2009  | Hiraoka et al. | 250/282 |

FOREIGN PATENT DOCUMENTS

| JP | 9-320515     |    | 12/1997 |
|----|--------------|----|---------|
| JP | 2001-009800  | A  | 1/2001  |
| JP | 2001-138300  | A  | 5/2001  |
| JP | 2005-098909  | A  | 4/2005  |
| JP | 2005098909   | A* | 4/2005  |

OTHER PUBLICATIONS

H.Masuda; "Preparation of Mesoporous Alumina by Anodic Oxidization and Application There of as Functional Material" Material Technology; vol. 5, No. 10; pp. 341-346; 1997.
T.R.Northern et al; "Clathrate Nanostructures for Mass Spectrometry"; Nature; vol. 449, 1033-1037; Supplementary Information; pp. 1-24; 1997.
H.Wang et al.; "Nanosphere Arrays with Controlled Sub-10-nm Gaps as Surface-Enhanced Raman Spectroscopy Substrates"; J. Am. Chem. Sec.; vol. 127; pp. 14992-14993; 2005.

* cited by examiner

Primary Examiner — Robert Kim
Assistant Examiner — David E Smith
(74) Attorney, Agent, or Firm — Studebaker & Brackett PC; Donald R. Studebaker

(57) ABSTRACT

A mass-spectrometry apparatus includes a substrate for mass spectrometry used in surface-assisted laser desorption/ionization mass spectrometry, a light irradiation means that irradiates sample S in contact with a surface of the substrate with measurement light L1 to desorb analyte R in sample S from the surface, a metal probe that generates near-field light at the leading end thereof by irradiation with measurement light L1, a detector that detects desorbed analyte Ri, and an analysis means that performs mass spectrometry on analyte R based on a detection result by the detector. The leading end of the metal probe is arranged in such a manner that the near-field light generated by irradiation with measurement light L1 is in contact with a measurement light irradiation portion of sample S. The metal probe is arranged, with respect to the measurement light irradiation portion, at a position different from the direction of the detector.

15 Claims, 9 Drawing Sheets

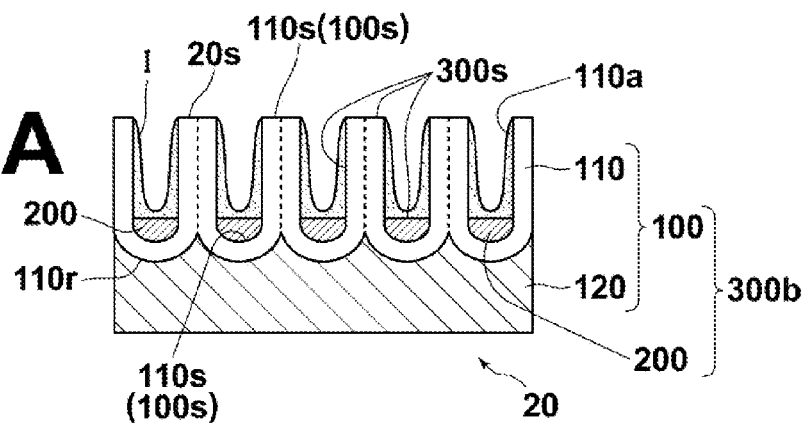
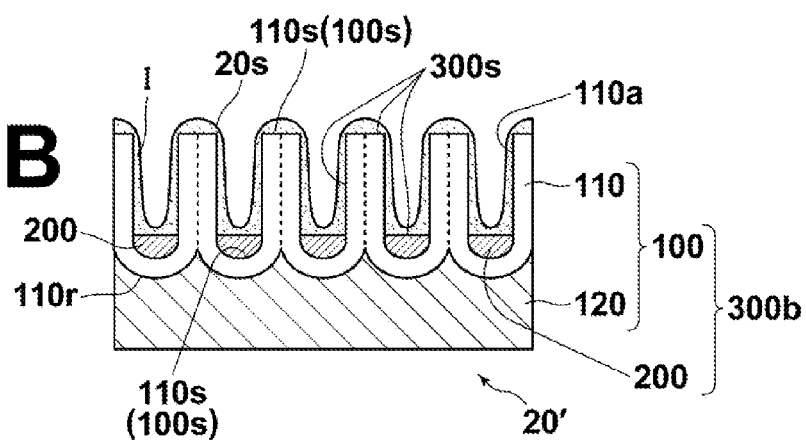
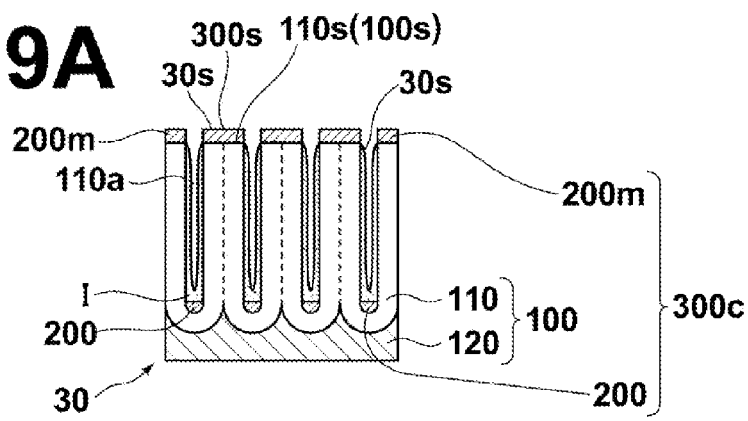
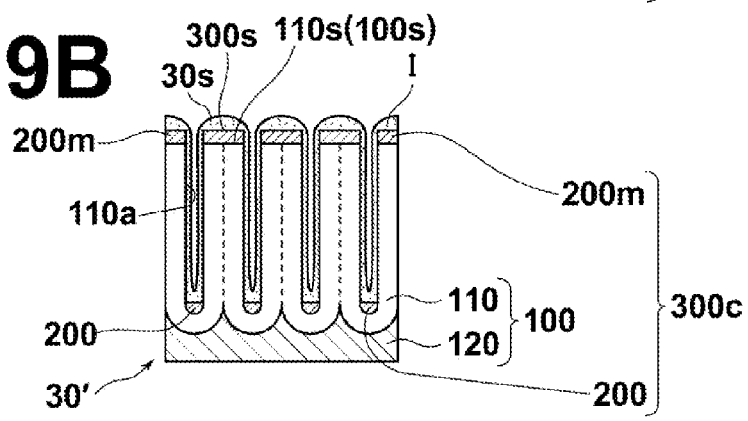

MASS SPECTROMETRY APPARATUS AND METHOD USING THE APPARATUS

BACKGROUND OF THE INVENTION

1. Field of the Invention

The present invention relates to amass spectrometry method, in which a sample in contact with a surface of a substrate for mass spectrometry is irradiated with measurement light to desorb an analyte contained in the sample from the surface of the substrate for mass spectrometry, and mass spectrometry is performed on the desorbed analyte. Further, the present invention relates to a mass spectrometry apparatus used in the mass spectrometry method.

2. Description of the Related Art

As mass spectrometry for identifying a substance or the like, a mass spectrometry method in which a sample in contact with a substrate for mass spectrometry is irradiated with measurement light to desorb an analyte from the substrate for mass spectrometry and the desorbed analyte is detected separately for each mass is known. For example, in a time-of-flight mass spectrometry (Time of Flight Spectroscopy: TOF-MS), a substance desorbed from a substrate is caused to fly for a predetermined distance, and the mass of the substance is analyzed based on the time period of flight of the substance.

In such mass spectrometry methods, the analyte is ordinarily ionized and desorbed. However, when the analyte is a substance that is hard to evaporate, such as an organism substance, or a high molecular weight substance, such as a synthetic high polymer (macromolecule), it is difficult to ionize and desorb the analyte. Therefore, various methods are studied to make it possible to perform mass spectrometry on such substances.

Especially, in mass spectrometry of a substance that is hard to evaporate, a biomolecule, a high molecular weight substance, such as a synthetic high polymer, or the like, a matrix-assisted laser desorption/ionization (MALDI) mass spectrometry is widely used as a soft method, which induces a relatively small chemical change, such as fragmentation and denaturation, in an analyte. In the MALDI, an analyte is mixed into sinapinic acid, glycerin or the like, which is called as a matrix, to form a mixed crystal. The mixed crystal is used as a sample, and the analyte is vaporized together with the matrix by using light energy absorbed by the matrix. Further, the analyte is ionized by movement of protons between the matrix and the analyte (please refer to Japanese Unexamined Patent Publication No. 9 (1997)-320515 and the like). However, when the analyte is a synthetic high polymer or the like, solubility to a solvent, the polarity of a polymer chain and the like greatly differ according to a difference in the chemical structure of the polymer chain. Further, even if the main chain structure is the same, various properties of the analyte differ according to a difference in an average molecular weight, the chemical structure of an end group, and the like. Therefore, it is necessary to optimize the kind of a matrix material and the method for preparing the crystal based on the kind of the analyte.

Further, a surface-assisted laser desorption/ionization-mass spectrometry (SALDI-MS) is being studied. In SALDI-MS, no matrix material is used, and a function for assisting desorption and ionization of the analyte is provided in the substrate for mass spectrometry per se to carry out soft ionization. For example, in the specification of U.S. Patent Application Publication No. 20080073512 and the specification of U.S. Patent Application Publication No. 20060157648, soft ionization is carried out by utilizing mutual reaction between a silicon nanostructure and measurement light in a substrate for mass spectrometry that adopts a porous silicon substrate, which has a nano-order porous structure on the surface thereof.

Further, Japanese Unexamined Patent publication No. 2005-098909 discloses an ionization apparatus in which desorption and ionization of an analyte is assisted by near-field light generated at the leading end of a metal probe by irradiation with measurement light, and a mass spectrometry apparatus using the ionization apparatus.

However, in the mass spectrometry apparatuses using the SALDI-MS and the metal probe, enhancement of the ion detection efficiency is insufficient. Therefore, when mass spectrometry is carried out on a substance that is hard to evaporate or a high molecular weight substance, high power measurement light is needed. Hence, problems, such as fragmentation and denaturation of the analyte, a drop in the S/N ratio by desorption of a substance contained in a portion of the sample in the vicinity of an irradiated portion, and a deformation of the substrate per se, remain unsolved.

SUMMARY OF THE INVENTION

In view of the foregoing circumstances, it is an object of the present invention to provide a mass spectrometry apparatus and a mass spectrometry method in which mass spectrometry can be carried out, using lower power light, on an analyte that is hard to evaporate or a high molecular weight substance at a high S/N ratio without causing fragmentation and denaturation of the analyte, and deformation of the substrate per se.

A mass spectrometry apparatus of the present invention is a mass spectrometry apparatus comprising:

a substrate for mass spectrometry that is used in surface-assisted laser desorption/ionization mass spectrometry;

a light irradiation means that irradiates a sample that is in contact with a surface of the substrate for mass spectrometry with measurement light to desorb an analyte contained in the sample from the surface of the substrate for mass spectrometry;

a metal probe that generates near-field light at the leading end thereof by irradiation with the measurement light;

a detector that detects the desorbed analyte; and an analysis means that performs mass spectrometry on the analyte based on a detection result by the detector, wherein the leading end of the metal probe is arranged in such a manner that the near-field light generated by irradiation with the measurement light is in contact with a measurement light irradiation portion of the sample, and wherein the metal probe is arranged, with respect to the measurement light irradiation portion of the sample, at a position in a different direction from the direction of the detector.

Here, the expression "the metal probe is arranged, with respect to the measurement light irradiation portion of the sample, at a position in a different direction from the direction of the detector" means that the metal probe is arranged so as not to interfere with detection of the analyte by the detector when the analyte is desorbed from the measurement light irradiation portion of the sample. In this case, the leading end of the metal probe is arranged in such a manner that the near-field light generated by irradiation with measurement light is in contact with the measurement light irradiation portion. Therefore, a part of the leading end of the metal probe alone may be located at a position at which interference with the analyte occurs.

It is desirable that the metal probe includes a metal microparticle (a very small particle, or the like) that can induce localized plasmons at the leading end thereof. For example, the metal microparticle essentially contains at least one kind of metal element selected from the group consisting of Au, Ag, Cu, Al, Pt, Ni and Ti (inevitable impurities may be contained). The term "essentially" means that the metal microparticle may contain inevitable impurities.

It is desirable that the mass spectrometry apparatus of the present invention further includes a position control unit that relatively changes the position of the leading end of the metal probe and an irradiation position of the measurement light along XY direction, which is an in-plane direction of the substrate for mass spectrometry on which the sample is mounted.

It is desirable that the mass spectrometry apparatus further includes:

an XY direction position sensor that detects the position of the metal probe with respect to XY direction; and a display unit that displays the position of the metal probe with respect to XY direction detected by the XY direction position sensor and a result of mass spectrometry by the analysis means with the metal probe located at the position with respect to XY direction, associating them with each other.

It is desirable that the substrate for mass spectrometry has, on a surface thereof, a microstructure (a very small structure, or the like) having a plurality of metal bodies the sizes of which can induce localized plasmons by irradiation with the measurement light and an ionization accelerating agent adhering to at least a part of a surface of the microstructure.

According to an embodiment of a mass spectrometry apparatus of the present invention, the substrate for mass spectrometry may include a dielectric having a plurality of micropores (very small pores, or the like) with closed bottoms that have openings on the surface of the substrate for mass spectrometry. Further, in the microstructure, the plurality of metal bodies may adhere to at least the closed bottoms of the plurality of micropores and/or to at least a part of a non-opening portion of the surface of the substrate for mass spectrometry, the non-opening portion not having the openings of the micropores.

According to another embodiment of a mass spectrometry apparatus of the present invention, the substrate for mass spectrometry may include a dielectric having a plurality of micropores with closed bottoms that have openings on the surface of the substrate for mass spectrometry. Further, in the microstructure, the plurality of metal bodies may include loading portions, which are loaded into the plurality of micropores (or which fill the plurality of micropores), and projection portions that are formed on the loading portions respectively so as to project from the surface of the substrate for mass spectrometry, the maximum diameter of each of the projection portions in a direction parallel to the surface of the substrate for mass spectrometry being greater than the diameters of respective loading portions in the direction parallel to the surface of the substrate for mass spectrometry. Further, at least a part of the projection portions of the plurality of metal bodies may be apart from each other. It is desirable that an average distance between the projection portions adjacent to each other is less than or equal to 10 nm.

It is desirable that the ionization accelerating agent is an organic silicon compound.

Further, it is desirable that the mass spectrometry apparatus is a time-of-flight mass spectrometry apparatus including a flight direction control means provided between the substrate for mass spectrometry and the detector. Further, it is desirable that the flight direction control means controls the direction of flight of the desorbed analyte and directs the desorbed analyte to a detection surface of the detector.

A mass spectrometry method of the present invention is a mass spectrometry method using the mass spectrometry apparatus of the present invention. The mass spectrometry method includes the steps of:

irradiating a measurement portion of the sample and the leading end of the metal probe with the measurement light after the sample is placed in contact with the surface of the substrate for mass spectrometry;

desorbing the analyte contained in the sample from the surface of the substrate for mass spectrometry by the measurement light having energy enhanced by an enhanced electric field by near-field light generated at the leading end of the metal probe by irradiation with the measurement light and by an enhanced electric field induced by a surface-assisting structure on the surface of the substrate for mass spectrometry; and capturing the desorbed analyte to perform mass spectrometry.

The mass spectrometry apparatus of the present invention may be used in surface-assisted laser desorption/ionization mass spectrometry (SALDI-MS). In the mass spectrometry apparatus of the present invention, the metal probe that generates near-field light at the leading end thereof by irradiation with measurement light is arranged at a position in a different direction from the direction of the detector with respect to the measurement light irradiation portion of the sample mounted on the SALDI substrate, in other words, when the metal probe and the detector are viewed from the measurement light irradiation portion of the sample, the metal probe is arranged in a different direction from the direction of the detector. Further, the metal probe is arranged so that the near-field light is in contact with the measurement light irradiation portion. When the mass spectrometry apparatus is structured in such a manner, it is possible to highly efficiently ionize an analyte on the sample contact surface of the SALDI substrate and desorb the analyte from the surface of the SALDI substrate by an ionization assisting effect derived from the SALDI substrate, an electric field enhancement effect by the near-field light generated at the leading end of the metal probe by irradiation with measurement light, and by a synergistic effect of the two effects.

For example, a SALDI substrate that can obtain an electric field enhancement effect by plasmons induced on the surface of the SALDI substrate by irradiation with measurement light is used. Further, a metal microparticle that induces localized plasmons is provided at the leading end of the metal probe. When the mass spectrometry apparatus is structured in such a manner, the intensities of both of the enhanced electric fields attenuate exponentially as distances from the enhanced electric field generation surfaces become longer. However, the intensities of the enhanced electric fields are extremely high in the very close vicinity of the enhanced electric field generation surfaces. Therefore, when the enhanced electric field generation surfaces are arranged in such a manner that the generated enhanced electric fields further enhance each other, it is possible to obtain an extremely highly enhanced electric field, which is called as a hot spot. Hence, the ionization efficiency is greatly improved.

In the mass spectrometry apparatus of the present invention, the metal probe is arranged, with respect to the measurement light irradiation portion of the sample, at a position in a different direction from the direction of the detector. Therefore, it is possible to minimize a reduction in the detection amount of the analyte.

Hence, according to the present invention, it is possible to lower the power of the measurement light in SALDI-MS. Therefore, even if the analyte is a substance that is hard to evaporate or a high molecular weight substance, mass spectrometry can be performed at high sensitivity without causing fragmentation and denaturation of the analyte, a drop in the S/N ratio, deformation of the substrate per se, and the like.

BRIEF DESCRIPTION OF THE DRAWINGS

FIG. 8A is a cross-sectional diagram illustrating a substrate for mass spectrometry appropriate for a mass spectrometry apparatus of the present invention in the thickness direction of the substrate (Second Embodiment);

FIG. 8B is a cross-sectional diagram illustrating another example of the substrate for mass spectrometry according to the second embodiment illustrated in FIG. 8A in the thickness direction of the substrate;

FIG. 9A is a cross-sectional diagram illustrating a substrate for mass spectrometry appropriate for a mass spectrometry apparatus of the present invention in the thickness direction of the substrate (Third Embodiment);

FIG. 9B is a cross-sectional diagram illustrating another example of the substrate for mass spectrometry according to the third embodiment illustrated in FIG. 9A in the thickness direction of the substrate;

DESCRIPTION OF THE PREFERRED EMBODIMENTS

"Mass Spectrometry Apparatus"

Figure 1:
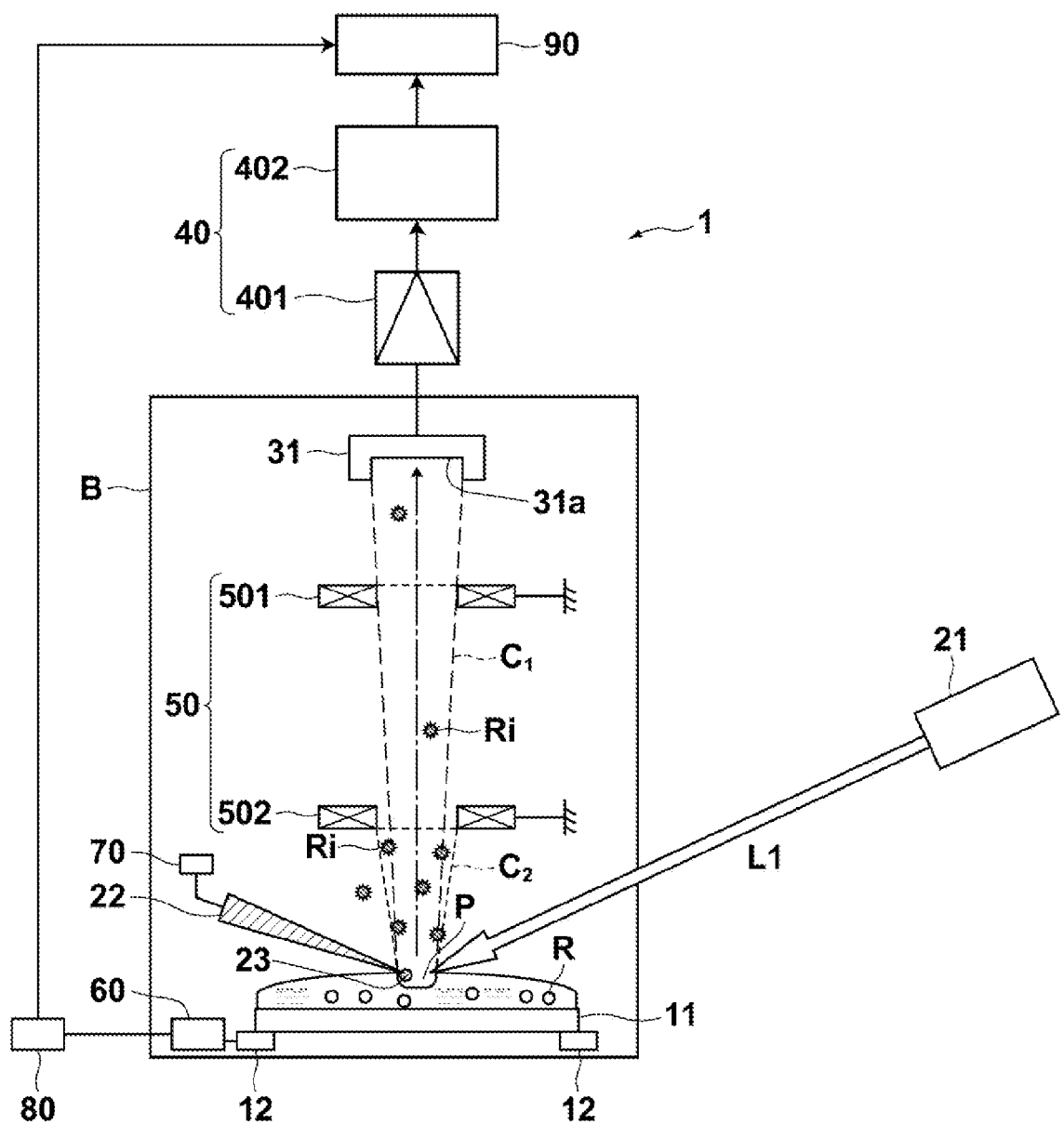
FIG. 1 is a schematic diagram illustrating the structure of a mass spectrometry apparatus according to an embodiment of the present invention.

A mass spectrometry apparatus according to an embodiment of the present invention will be described with reference to FIG. 1. The mass spectrometry apparatus according to the present embodiment is a time-of-flight mass spectrometry apparatus (TOF-MS). FIG. 1 is a schematic diagram illustrating the structure of amass spectrometry apparatus 1 of the present embodiment. In FIG. 1, each element is appropriately illustrated in a different scale from the actual size thereof so that they are easily recognized.

As illustrated in FIG. 1, the mass spectrometry apparatus includes a substrate 11 for surface-assisted laser desorption/ionization mass spectrometry (hereinafter, referred to as a SALDI substrate), a device holding means 12, a metal probe 22, and a detector 31 in box B that is kept vacuum. The device holding means 12 holds the SALDI substrate 11. The metal probe 22 generates near-field light at the leading end thereof. The detector 31 detects desorbed analyte Ri. The mass spectrometry apparatus also includes a light irradiation means 21. The light irradiation means 21 irradiates sample S that is in contact with a surface of the SALDI substrate 11 with measurement light L1 to desorb analyte R contained in sample S from the surface of the substrate. Further, the mass spectrometry apparatus includes an analysis means 40 to perform mass spectrometry on the analyte Ri based on an output from the detector 31.

The metal probe 22 is arranged at a position in a different direction from the direction of the detector 31 with respect to measurement light irradiation portion P of sample S, which is irradiated with the measurement light L1, in other words, when the metal probe 22 and the detector 31 are viewed from the measurement light irradiation portion P of the sample S, the metal probe 22 is arranged in a different direction from the direction of the detector 31. Further, the leading end of the metal probe 22 is arranged in such a manner that the near-field light generated at the leading end of the metal probe 22 is in contact with the measurement light irradiation portion P. In the present embodiment, a metal microparticle (very small metal particle) 23 is provided at the leading end of the metal probe 22. Further, the metal probe 22 includes a probe drive control means 70. The probe drive control means 70 adjusts a distance between the metal microparticle 23 at the leading end of the metal probe 22 and the sample S in such a manner that the near-field light generated at the leading end of the metal probe 22 by irradiation with the measurement light L1 is in contact with the measurement light irradiation portion P of the sample S.

The analysis means 40 basically includes an amplifier 401 and a data processing unit 402. The amplifier 401 amplifies an output from the detector 31, and the data processing unit 402 processes an output signal from the amplifier 401.

Since the mass spectrometry apparatus of the present embodiment is a time-of-flight mass spectrometry apparatus (TOF-MS), a flight direction control means 50 is provided between the SALDI substrate 11 and the detector 31. The flight direction control means 50 is not particularly limited as long as it is generally used in TOF-MS. In the present embodiment, the flight direction control means 50 includes a drawing grid 502 and an end plate 501. The drawing grid 502 is arranged so as to face a surface of the SALDI substrate 11. The end plate 501 is arranged so as to face a surface of the drawing grid 502, the surface being opposite to the substrate 11 for mass spectrometry side of the drawing grid 502.

As described in the section of "Summary of the Invention" in this specification, the expression "the metal probe 22 is arranged at a position in a different direction from the direction of the detector 31 with respect the measurement light irradiation portion P of the sample S" means that the metal probe 22 is arranged so as not to interfere with detection of the analyte Ri by the detector 31 when the analyte Ri is desorbed from the measurement light irradiation portion P of the sample S.

Specifically, the metal probe 22 is arranged in such a manner to minimize the metal probe 22 that is located in a flight space in which the analyte Ri desorbed from the measurement light irradiation portion P flies toward a detection surface 31a of the detector 31. At the same time, the metal probe 22 is arranged in such a manner that the metal probe 22 can still assist ionization. It is desirable that the ionization assisting effect by the metal probe 22 is as effective as possible.

Figure 2:
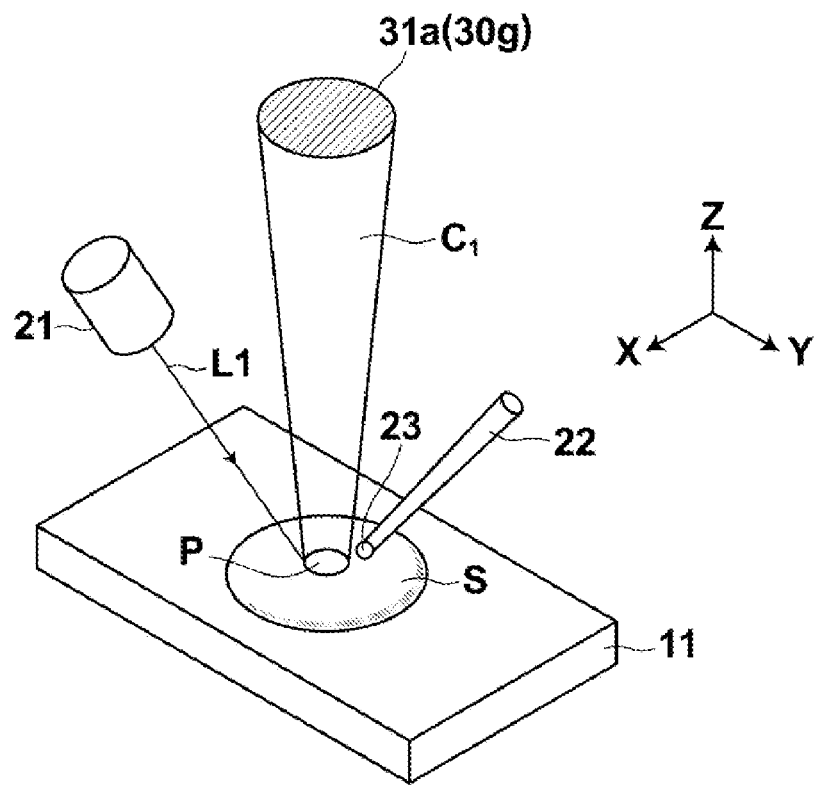
FIG. 2 is a diagram illustrating a positional relationship of a metal probe in the mass spectrometry apparatus illustrated in FIG. 1 (No. 1)
Figure 3:
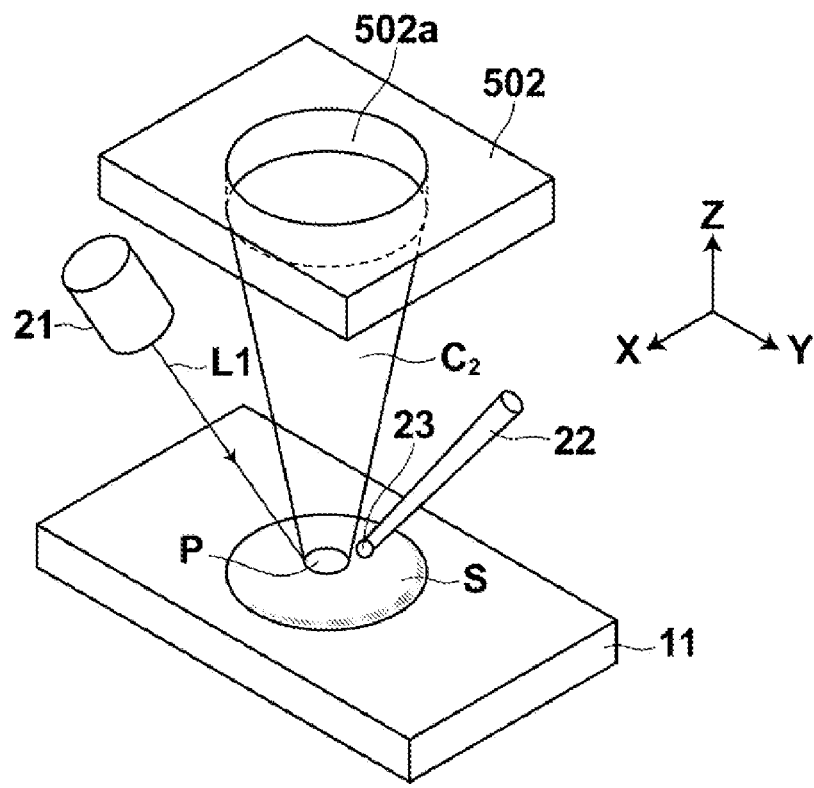
FIG. 3 is a diagram illustrating a positional relationship of a metal probe in the mass spectrometry apparatus illustrated in FIG. 1 (No. 2)

The metal probe 22 is arranged so as to extend from the leading end thereof to the base portion thereof, which is opposite to the leading end. For example, when the flying space of the desorbed analyte Ri is space $C_1$, which is a conic space including the detection surface 31a of the detector 31 and the measurement light irradiation portion P, the metal probe 22 is arranged on the outside of the space $C_1$. When the flying space of the desorbed analyte Ri is space $C_2$, which is a conic space including an opening 502a of the drawing grid 502 and the measurement light irradiation portion P, the metal probe 22 is arranged on the outside of the space $C_2$. The metal probe 22 is arranged so that the ionization assisting effect by the near-field light generated by the leading end of the metal probe 22 and the metal microparticle 23 at the leading end of the metal probe 22 is obtained (please refer to FIGS. 2 and 3).

Japanese Unexamined Patent Publication No. 2005-098909 discloses mass spectrometry using a metal probe, and a hollow probe is used to prevent the metal probe from interfering with detection of the analyte desorbed from the measurement irradiation portion of the sample. However, since the diameter of the leading end of a probe that can generate near-field light is very small, it is difficult to highly efficiently pass the analyte Ri through a hole provided at the leading end of the metal probe 22. However, in the present embodiment, a simple structure as described above can highly efficiently prevent the metal probe from interfering with detection.

Figure 4A:
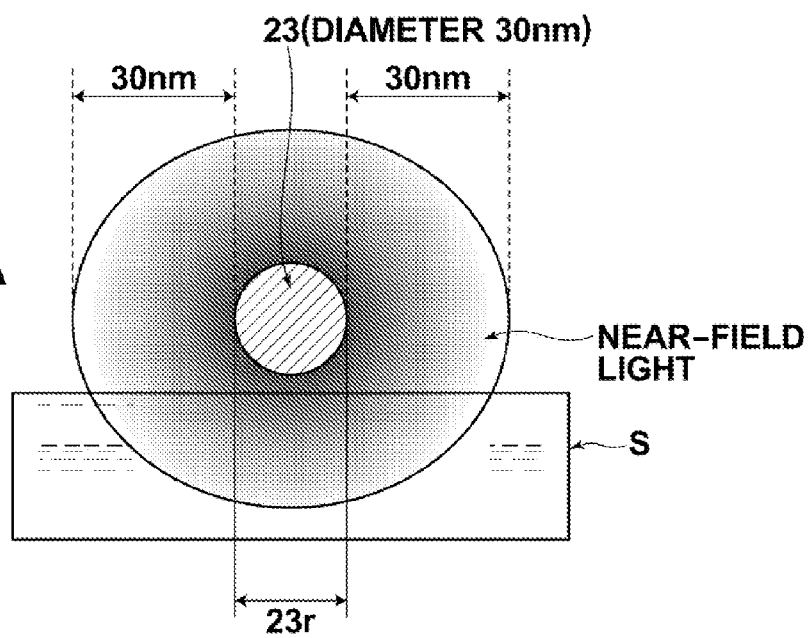
FIG. 4A is a diagram illustrating an example of a positional relationship between a sample and near-field light generated at a metal microparticle.

The ionization assisting effect by the leading end of the metal probe 22 is obtained when the near-field light generated by the metal microparticle 23 at the leading end of the metal probe 22 is in contact with the measurement light irradiation portion P of the sample S. However, as illustrated in FIG. 4A, the intensity of the electric field is higher when the distance from the metal surface at which the near-field light is generated is shorter. The intensity of the electric field exponentially attenuates as the distance from the metal surface increases. Therefore, it is desirable that the metal microparticle 23 is arranged as close to the measurement light irradiation portion P as possible. In FIG. 4A, the distribution of the intensities of the electric field of the near-field light is illustrated by changing the density of shading.

A drive control method for adjusting the distance between the leading end of the metal probe 22 and the measurement light irradiation portion P is not particularly limited. For example, the thickness of measurement sample S may be measured in advance, and the metal probe 22 may be arranged, based on the thickness, so that the measurement light irradiation portion P is located within the range of the near-field light. Alternatively, interatomic force acting on the metal probe 22 and the measurement sample S may be detected, and the metal probe 22 may be arranged so that the interatomic force becomes a value that can obtain an appropriate intensity of near-field light. For example, the method utilizing the interatomic force may be carried out by applying the principle of anatomic force microscope (AFM) and by using, as the drive control means 70, an optical lever or a tuning fork. Alternatively, after the leading end of the metal probe 22 (metal microparticle 23) is placed in contact with the sample S once, the leading end of the metal probe 22 may be moved away from the sample S by a predetermined distance. A contact state of the metal probe 22 may be detected by detecting a warp or bend of the metal probe 22 by using the optical lever. Alternatively, the contact state may be detected by detecting a pressure by the tuning fork.

The SALDI substrate 11 is not particularly limited. However, it is desirable that the SALDI substrate 11 can achieve a higher surface assisting effect so that lower power measurement light L1 can be used. For example, a SALDI substrate that can induce localized plasmons on the surface thereof by irradiation with measurement light L1, or the like may be used. Such examples of the SALDI substrate will be described later.

The light irradiation means 21 includes a single wavelength light source, such as a laser. Further, a light guide system, such as a mirror, which guides light output from the light source may be provided. The wavelength of the single wavelength light source can ionize the analyte R, and generate near-field light or plasmons at the leading end of the metal probe 22 or the metal microparticle 23. In the present embodiment, ionization of the analyte R and generation of the near-field light or plasmons at the metal probe 22 or the metal microparticle 23 are carried out by a single light source. Alternatively, a plurality of light sources that are appropriate for respective operations may be provided.

As described above, the metal probe 22 and the metal microparticle 23 should generate near-field light or plasmons by irradiation with measurement light L1. For that purpose, it is sufficient if at least the surface of the metal probe 22 or the surface of the metal microparticle 23 is metal. However, it is desirable that the metal probe 22 and the metal microparticle 23 are made of at least one kind of metal selected from the group consisting of Au, Ag, Cu, Al, Pt, Ni, and Ti (inevitable impurities may be contained) to obtain a more effective electric field enhancement effect. Optionally, the metal may be Au or Ag.

The metal microparticle 23 may be formed at the leading end of the metal probe 22, for example, by vapor deposition (evaporation), oblique vapor deposition, sputtering, etching after plating, or the like. When the vapor deposition method or the oblique vapor deposition method are used, it is desirable that high-temperature annealing is carried out after vapor deposition. Further, the processing after plating may be carried out by an EB method instead of etching.

The metal probe 22 is not particularly limited as long as near-field light is generated at the leading end of the metal probe 22 by irradiation with the measurement light L1. When the diameter (maximum diameter) of the metal probe 22 at the leading end thereof is less than or equal to the wavelength of the measurement light L1, localized surface-enhancement plasmon polaritons are generated at the leading end of the metal probe 22. Therefore, the intensity of the electric field of near-field light is enhanced at least 100 times greater than the intensity of the incidence field thereof. Hence, it is desirable that the diameter of the leading end of the metal probe 22 is less than or equal to the wavelength of the measurement light L1. When the metal probe 22 is structured in such a manner, it is possible to effectively lower the intensity of the measurement light L1 that is necessary to ionize the analyte R.

Further, when the diameter of the leading end of the metal probe 22 is smaller, the spatial resolution is higher. The current level of metal probe process techniques can achieve high spatial resolution that is less than or equal to 10 nm. Therefore, it is possible to achieve high-resolution ionization by using a low power light source by reducing the diameter of the leading end of the metal probe 22. Hence, it is desirable that the diameter of the leading end of the metal probe 22 can obtain an effective electric field enhancement effect, and that the diameter is as small as possible.

Figure 4B:
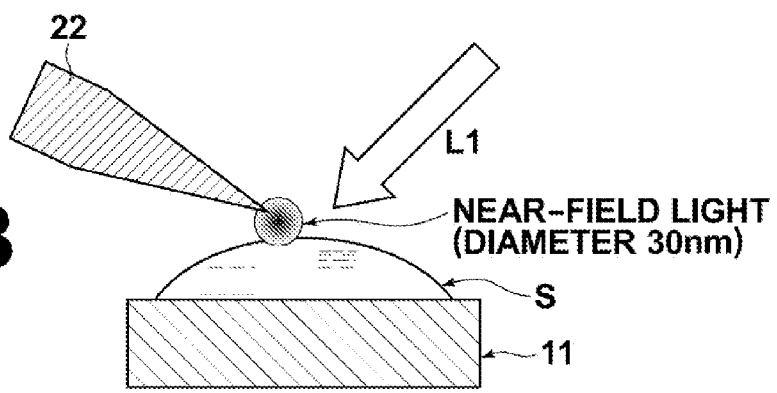
FIG. 4B is a diagram illustrating an example of a positional relationship between a metal probe and a sample when no metal particle is provided at the metal probe.
Figure 4C:
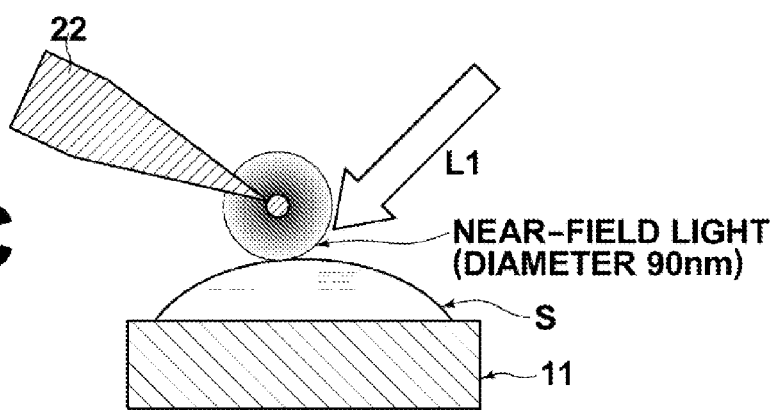
FIG. 4C is a diagram illustrating an example of a positional relationship between a metal probe and a sample when a metal particle is provided at the metal probe.

Further, when the metal microparticle 23 is provided at the leading end of the metal probe 22, localized plasmons are induced at the metal microparticle 23 by irradiation with the measurement light L1. Therefore, the electric field enhancement effect by the near-field light at the leading end of the metal probe 22 and the electric field enhancement effect by the localized plasmons are obtained at the same time. Hence, it is possible to more effectively lower the intensity of the measurement light L1. In this case, when the diameter of the leading end of the metal probe 22 can generate localized surface-enhancement plasmon polaritons at the leading end of the metal probe 22, the electric field enhanced by the localized plasmons is further enhanced by the surface-enhancement plasmon polaritons, and a high synergistic effect is obtained. For example, as illustrated in FIG. 4B, when the metal microparticle 23 is not provided at the leading end of the metal probe 22, the diameter of the near-field light generated at the leading end of the metal probe 22 is approximately 30 nm. However, as illustrated in FIG. 4C (FIG. 4A), when the metal microparticle 23 the diameter 23r of which is approximately 30 nm is provided, the near-field light the diameter of which is approximately 90 nm, which is substantially three times greater than the diameter of the near-field light generated without the metal microparticle 23, is generated.

In a manner similar to the diameter of the leading end of the metal probe 22, it is desirable that the diameter 23r of the metal microparticle can obtain an effective electric field enhancement effect, and that the diameter is as small as possible.

In the present embodiment, a position control unit 60, an XY direction position sensor 80, and a display unit 90 are provided. The position control unit 60 relatively changes the position of the leading end of the metal probe 22 and the irradiation position of the measurement light L1 along XY direction, which is an in-plane direction of the SALDI substrate 11. The XY direction position sensor 80 detects the position of the metal probe 22 with respect to XY direction. The display unit 90 displays the position of the metal probe 22 with respect to XY direction, detected by the XY direction position sensor 80, and the result of mass spectrometry when the metal probe 22 is located at the position, associating them with each other. Therefore, it is possible to display the in-plane distribution of the results of mass spectrometry of the sample S with respect to the in-plane direction, which is parallel to the surface of the SALDI substrate 11.

Figure 5A:
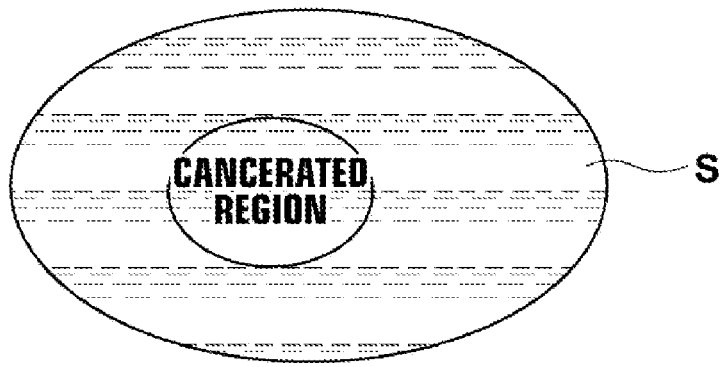
FIG. 5A is a diagram illustrating an image of two-dimensional imaging mass spectrometry (No. 1)
Figure 5B:
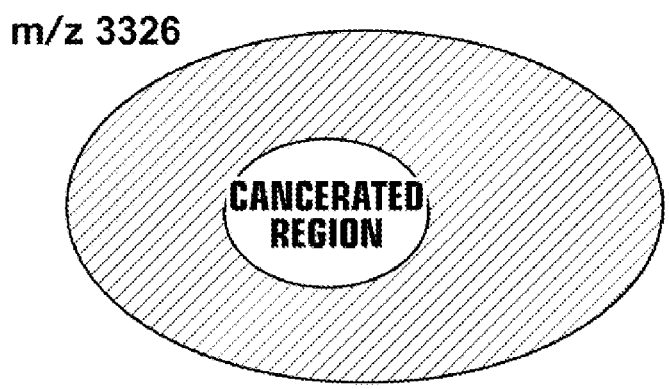
FIG. 5B is a diagram illustrating an image of two-dimensional imaging mass spectrometry (No. 2)
Figure 5C:
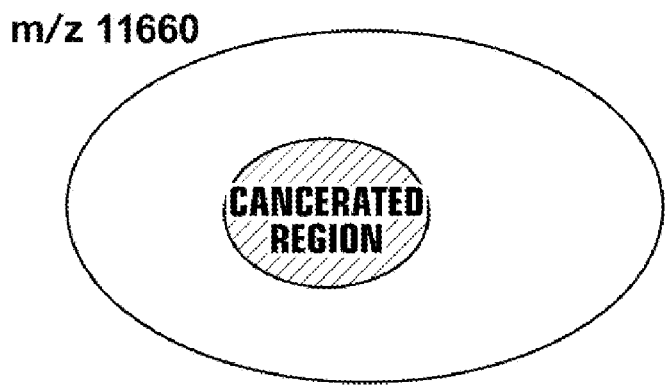
FIG. 5C is a diagram illustrating an image of two-dimensional imaging mass spectrometry (No. 3)

For example, mass spectrometry may be performed to detect a cancerated region in biosample (sample) S, as illustrated in FIG. 5A. In a normal cell, the peak appears in the vicinity of m/z=3326. In contrast, in a cancerated cell, the peak appears in the vicinity of m/z=11660. Therefore, it is possible to detect a cancerated cell by performing mass spectrometry on the biosample S with respect to the in-plane direction, and by detecting presence of the peak at m/z=3326 (FIG. 5B) or presence of the peak at m/z=11660 (FIG. 5C). Accordingly, it is possible to detect a cancerated cell and to display an image in such a manner to specify a cancerated region.

As described above, the mass spectrometry apparatus 1 can perform highly efficient ionization of the analyte R at high spatial resolution and highly efficient desorption of the analyte R from the surface by appropriately designing the diameter of the leading end of the metal probe 22 and/or the diameter of the metal microparticle 23. Therefore, it is possible to reduce the power of the measurement light L1. Hence, even if the analyte R is a substance that is hard to evaporate or a high molecular weight substance, fragmentation and denaturation do not occur, and a deformation of the substrate per se does not occur. Further, it is possible perform highly sensitive mass spectrometry at a high S/N ratio. Hence, it is possible to accurately identify a denatured region of a cell, such as a cancerated region, in a biosample or an organism substance.

Next, mass spectrometry using the mass spectrometry apparatus 1, which is structured as described above, will be described.

First, voltage Vs is applied to the substrate 11 for mass spectrometry that is in contact with sample S. Further, predetermined position P of the sample S mounted on the substrate 11 for mass spectrometry is irradiated, based on a predetermined start signal, by the light irradiation means 21 with measurement light L1 having a specific wavelength. The substrate 11 for mass spectrometry is a SALDI substrate. Therefore, the electric field of the measurement light L1 is enhanced at the surface of the substrate 11 for mass spectrometry, and analyte R contained in the sample is ionized by the light energy of the enhanced measurement light L1, and desorbed from the surface of the substrate 11 for mass spectrometry.

The desorbed analyte Ri is drawn toward the direction of the drawing grid 502 by electric potential difference Vs between the substrate 11 for mass spectrometry and the drawing grid 502, and accelerated. Further, the analyte Ri passes through a hole at the center of the drawing grid 502, and flies substantially straight toward the direction of the end plate 501. Further, the analyte Ri passes through the opening of the end plate 501, and reaches the detector 31 to be detected.

The speed of flight of the desorbed analyte Ri depends on the mass of the substance. The speed of flight is higher as the mass of the substance is smaller. Therefore, substances are sequentially detected by the detector 31 in the ascending order of the values of mass, in other words, the smallest mass substance is detected first.

An output signal from the detector 31 is amplified to a predetermined level by the amplifier 401 in the analysis means 40, and input to the data processing unit 402. Since a synchronous signal that synchronized with the start signal has been input to the data processing unit 402, the data processing unit 402 can obtain the time of flight of the analyte Ri based on the synchronous signal and the output signal from the amplifier 401. Therefore, the data processing unit 402 can obtain mass spectrum by calculating the mass based on the time of flight.

In the present embodiment, a case in which the mass spectrometry apparatus 1 is a TOF-MS apparatus was described as an example. However, the mass spectrometry apparatus 1 of the present invention may be applied to other kinds of mass spectrometry methods. Further, in the present embodiment, a case of providing the metal microparticle 23 at the leading end of the metal probe 22 was described as an example. However, it is not necessary that the metal microparticle 23 is provided, and an effect as described above can be achieved without the metal microparticle 23.

Next, a SALDI substrate appropriate for the mass spectrometry apparatus of the present embodiment will be described.

First Embodiment of Substrate for Mass Spectrometry (SALDI Substrate)

Figure 6A:
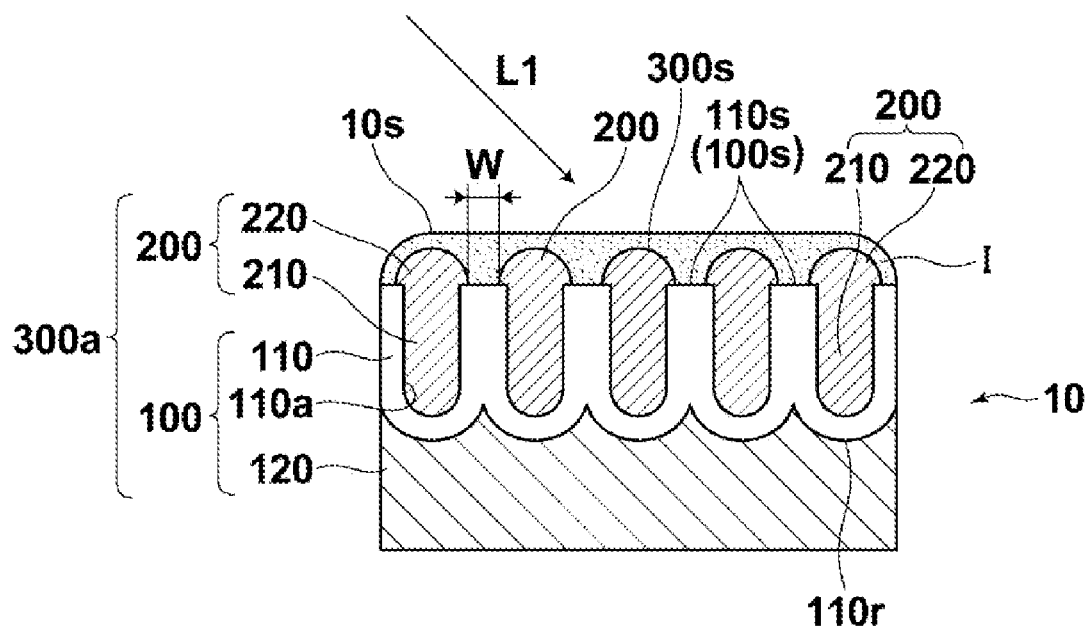
FIG. 6A is a cross-sectional diagram illustrating a substrate for mass spectrometry appropriate for a mass spectrometry apparatus of the present invention in the thickness direction of the substrate (First Embodiment)
Figure 6B:
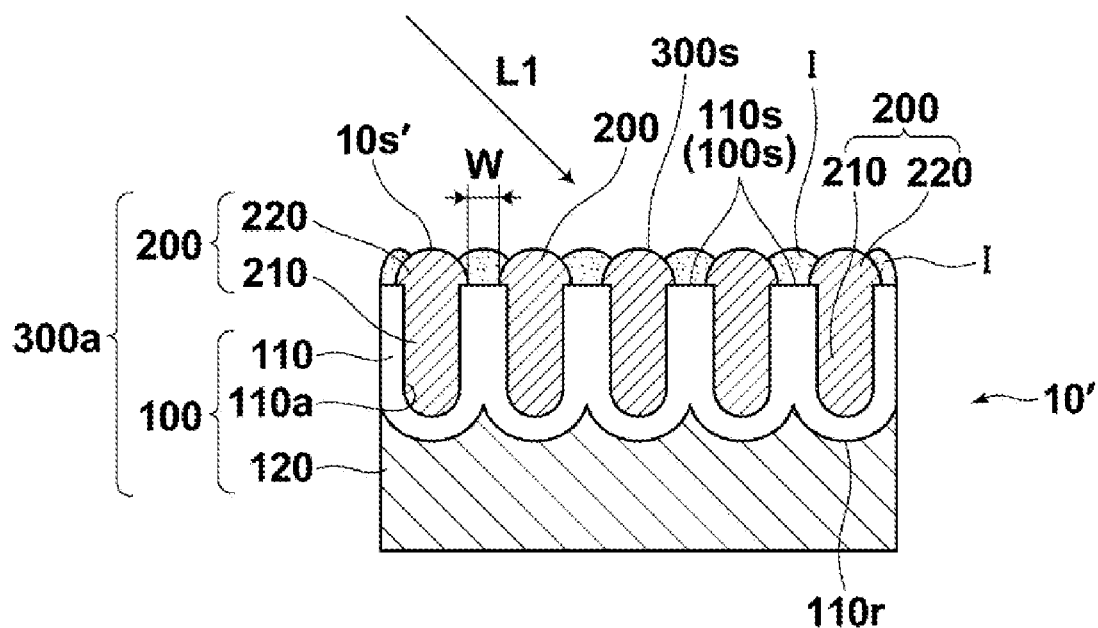
FIG. 6B is a cross-sectional diagram illustrating another example of the substrate for mass spectrometry according to the first embodiment illustrated in FIG. 6A in the thickness direction of the substrate.

With reference to FIGS. 6A and 6B, the substrate for mass spectrometry (SALDI substrate) in the first embodiment of the present invention will be described. FIGS. 6A and 6B are cross-sectional diagrams of the substrates for mass spectrometry in the thickness directions of the substrates. FIGS. 7A through 7E are diagram illustrating the process of producing the substrates for mass spectrometry. In FIGS. 6A, 6B and 7A through 7E, each element is appropriately illustrated in a different scale from the actual size thereof so that the elements are easily recognized.

As illustrated in FIGS. 6A and 6B, a SALDI substrate 10 (10') of the present embodiment desorbs analyte R, which is a target of mass spectrometry contained in a sample, from the surface 10s (10s') of the SALDI substrate 10 (10') by irradiation of the sample in contact with the surface 10s (10s') with measurement light L1. The SALDI substrate 10 (10') has a device structure including a microstructure 300a and ionization accelerating agent I. The microstructure 300a includes a substrate 100 and a plurality of metal bodies (micro metal bodies, very small metal bodies, or the like) 200 on a surface 100s of the substrate 100. The sizes of the plurality of metal bodies 200 can induce localized plasmons by irradiation with the measurement light L1. The ionization accelerating agent I adheres to at least a part of a surface 300s of the microstructure 300a.

In the present embodiment, the SALDI substrate 10(10') includes the substrate 100 and a plurality of metal bodies (micro metal bodies, which are very small metal bodies, or the like) 200 fixed to the substrate 100. In the substrate 100, a dielectric 110 is formed on a conductor 120. In the dielectric 110, a multiplicity of micropores 110a that have substantially the same form when viewed in a plan view direction are substantially regularly arranged. The multiplicity of micropores 110a have openings on the surface 110s of the dielectric 110. Further, each of the plurality of micro metal bodies 200 includes a loading portion 210, which is loaded into the inside of the micropore 110a, and a projection portion 220. The projection portion 220 is formed on the micropore 110a in such a manner to project from the surface 110s (100s). The maximum diameter of the projection portion 220 in a direction parallel to the surface 110s is larger than the diameter of the loading portion 210, and the diameter (size) of the projection portion 220 can induce localized plasmons. The micro metal bodies 200 are fixed in such a manner that at least a part of the projection portions 220 are apart from each other.

In the SALDI substrate 10 (10'), the micropore 110a is formed from the surface 110s of the dielectric 110 substantially straight in the thickness direction of the dielectric 110. The micropore 110a is a non-through hole, which does not reach the back side 110r of the dielectric 110, and therefore which has a closed bottom.

In the present embodiment, as illustrated in FIGS. 7A through 7E, the dielectric 110 is an alumina ($Al_2O_3$) layer (metal oxide layer) 410. The alumina layer 410 is obtained by anodically oxidizing a part of a metal body 400 to be anodically oxidized. The main component of the metal body 400 to be anodically oxidized is aluminum (Al), and a minute amount of impurity may be contained in the metal body 400 to be anodically oxidized. The conductor 120 is formed by a non-anodically-oxidized portion 420 of the metal body 400 to be anodically oxidized, the non-anodically-oxidized portion 420 having remained without being anodically oxidized.

The form of the metal body 400 to be anodically oxidized is not limited. The form of the metal body 400 to be anodically oxidized may be flat plate form, or the like. Further, the metal body 400 to be anodically oxidized may be attached onto a support body. For example, the metal body 400 to be anodically oxidized may be deposited or formed, in layer form, on a substrate.

The anodic oxidization may be carried out, for example, by using, as an anode, the metal body 400 to be anodically oxidized and by using, as a cathode (counter electrode), carbon, aluminum or the like. The anode and the cathode are immersed in an electrolytic solution for anodic oxidization, and a voltage is applied between the anode and the cathode. The electrolytic solution is not limited. Optionally, an acid electrolytic solution containing one or at least two kinds of acids selected from sulfuric acid, phosphoric acid, chromic acid, oxalic acid, sulfamine acid, benzenesulfonic acid and the like may be used.

Figure 7A:
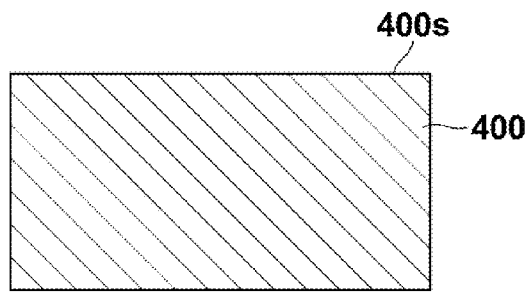
FIG. 7A is a cross-sectional diagram illustrating the process of producing the substrate for mass spectrometry illustrated in FIG. 6A (No. 1)
Figure 7B:
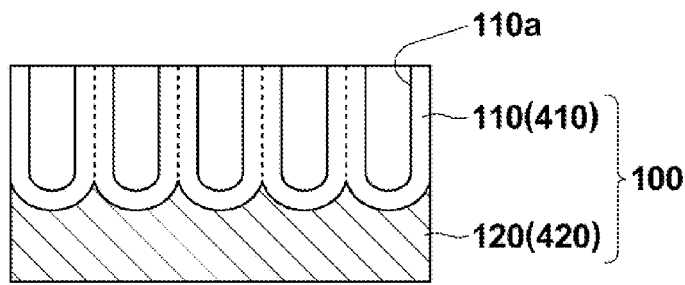
FIG. 7B is a cross-sectional diagram illustrating the process of producing the substrate for mass spectrometry illustrated in FIG. 6A (No. 2)

When the metal body 400 to be anodically oxidized illustrated in FIG. 7A is anodically oxidized, oxidization progresses from the surface 400s (upper surface in FIG. 7A) in a direction substantially perpendicular to the surface 400s, as illustrated in FIG. 7B. Accordingly, an alumina layer 410 (110) is formed.

The alumina layer 410 (110) formed by anodic oxidization is structured in such a manner that micro column members (very small column members) are arranged next to each other, and the form of each of the micro column members is an equilateral hexagon when viewed in a plan view direction. Further, a micropore 110a is formed substantially at the center of each of the micro column members from the surface 400s in the depth direction of the micro column members. The closed bottom of each of the micropores 110a and the bottom of each of the micro column members are rounded, as illustrated in FIGS. 7B through 7E. The structure of the alumina layer produced by anodic oxidization is described in H. Masuda, "Preparation of Mesoporous Alumina by Anodic Oxidization and Application Thereof as Functional Material", Material Technology, Vol. 15, No. 10, pp. 341-346, 1997, and the like.

The anodic oxidization conditions should be appropriately designed so that a non-anodically-oxidized portion remains and that the depths of the micropores 110a are sufficiently deep to prevent the micro metal bodies 200 from easily peeling or dropping from the alumina layer 110 (dielectric). When oxalic acid is used as the electrolytic solution, appropriate conditions are, for example, the density of the electrolytic solution of 0.5 M, and the temperature of the solution at 15° C., and an application voltage of 40V. The alumina layer 410 (110) with an arbitrary layer thickness can be produced by changing the time period of electrolysis. When the thickness of the metal body 40 to be anodically oxidized, which is prepared before anodic oxidation, is set thicker than the thickness of the alumina layer 410 (110) to be produced, a non-anodically-oxidized portion remains. Accordingly, the alumina layer 410 (dielectric) (110) is formed on the conductor 420 (120), which is made of the non-anodically-oxidized portion. In the alumina layer 410 (110), a multiplicity of micropores 110a have openings on the surface 110s of the alumina layer, and are substantially regularly arranged. Further, the multiplicity of micropores 110a have substantially the same form when viewed in a plan view direction.

The diameter of each of the micropores and the pitch of arrangement of the micropores adjacent to each other may be controlled by changing the anodic oxidization conditions. It is desirable that the diameter and the pitch are less than the wavelength of the measurement light L1. Ordinarily, the pitch of arrangement of the micropores 110a adjacent to each other can be controlled in the range of 10 to 500 nm. Further, the diameter of the micropore 110a can be controlled in the range of 5 to 400 nm. Japanese Unexamined Patent Publication No. 2001-009800 and Japanese Unexamined Patent Publication No. 2001-138300 disclose methods for more precisely controlling the formation position and the diameter of the micropore. When these methods are used, it is possible to substantially regularly arrange the micropores with arbitrary diameters and depths within the aforementioned ranges.

Next, the micro metal body 200, which includes the loading portion 210 and the projection portion 220, is formed in each of the micropores 110a of the substrate 100 to form the microstructure 300a. The micro metal body 200 is formed by electroplating the micropore 110a in the dielectric 110 or the like.

Figure 7C:
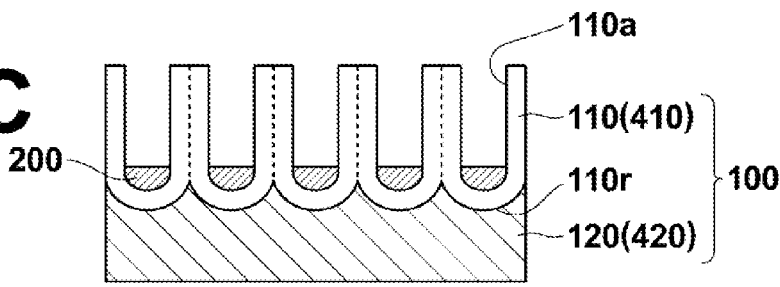
FIG. 7C is a cross-sectional diagram illustrating the process of producing the substrate for mass spectrometry illustrated in FIG. 6A (No. 3)
Figure 7D:
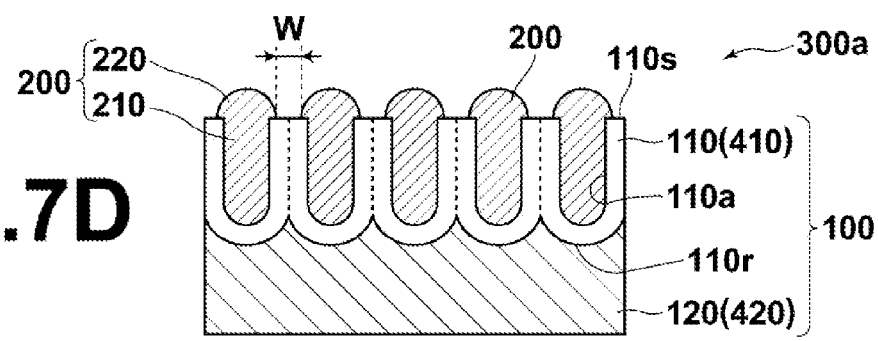
FIG. 7D is a cross-sectional diagram illustrating the process of producing the substrate for mass spectrometry illustrated in FIG. 6A (No. 4)

When electroplating is carried out, the conductor 120 functions as an electrode, and the metal precipitates first from the bottom of the micropore 110a, at which the intensity of the electric field is high (FIG. 7C). When electroplating is continued, metal is loaded into the inside of the micropore 110a or the inside of the micropore 110a is filled with the metal, and the loading portion 210 of the micro metal body 200 is formed. When electroplating is continued after the loading portion 210 is formed, the metal for loading overflows from the micropore 110a. However, the intensity of the electric field in the vicinity of the micropore 110a is high, the metal continues to precipitate around the circumference of the micropore 110a. Accordingly, the projection portion 220 with a diameter larger than that of the loading portion 210, the projection portion 220 projecting from the surface 110s, is formed on the loading portion 210. Accordingly, the microstructure 300a is obtained (FIG. 7D).

In the micro metal body 200, the size of the projection 220 should be able to induce localized plasmons. Optionally, the maximum diameter of the projection portion 220 may be less than the wavelength of the measurement light L1. When the wavelength of the measurement light L1 is taken into consideration, it is desirable that the maximum diameter of the projection portion 220 is greater than or equal to 10 nm and less than or equal to 300 nm.

In the microstructure 300a, it is desirable that the projection portions 220 adjacent to each other are apart from each other. Optionally, average distance w between the projection portions may be in the range of a few nanometers (nm) to 10 nm. It is desirable that the average distance w is set in the above-mentioned range, because when the average distance w is set in such a manner, a so-called hot spot is generated in the vicinity of the projection 220 by a localized plasmon effect. In the hot spot, the electric field enhancement effect is extremely high.

Localized plasmons are a phenomenon in which a high-intensity electric field is generated in the vicinity of a projection portion by oscillation of free electrons in the projection portion that resonate with the electric field of light. Therefore, the micro metal body 200 should be made of an arbitrary metal having free electrons. For example, Au, Ag, Cu, Pt, Ni, Ti and the like may be used. Optionally, Au, Ag or the like, which has a high electric field enhancement effect, may be used.

In the present embodiment, the micropore 110a is a non-through hole, which does not reach the back side 110r of the dielectric. Further, the loading portion 210 of the micro metal body 200 is loaded into the inside of the micropore 110a. Therefore, the micro metal body 200 and the conductor 120 are not electrically connected to each other.

Figure 7E:
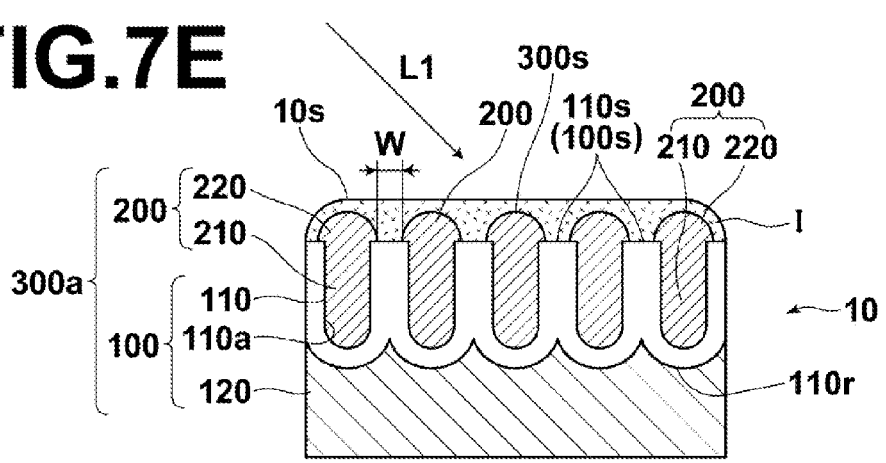
FIG. 7E is a cross-sectional diagram illustrating the process of producing the substrate for mass spectrometry illustrated in FIG. 6A (No. 5)

Next, ionization accelerating agent I is caused to adhere to at least a part of the surface 300s of the microstructure 300a to obtain the SALDI substrate 10 (FIG. 7E). The method for causing the ionization accelerating agent I to adhere to the surface is not particularly limited. For example, an appropriate amount of solution containing the ionization accelerating agent I may be applied to the surface 300s, and the surface 300s may be heated by using an oven or the like to remove the solvent from the surface 300s. After heating, excessive ionization accelerating agent I may be removed by blowing using an air gun or the like, and heating process may be carried out again or repeated to prevent adhesion of excessive ionization accelerating agent I onto the surface 300s.

The amount of the ionization accelerating agent I that is caused to adhere to the surface 300s is not particularly limited. When the amount of the ionization accelerating agent I is excessive, measurement light L1 that is sufficient for inducing localized plasmons at the micro metal body 200 does not reach the micro metal body 200. Further, the excessive amount of ionization accelerating agent I is desorbed during measurement, and detected. Hence, the sensitivity of detection becomes lower. When the amount of ionization accelerating agent I is too small, it becomes impossible to effectively ionize the analyte. In the present embodiment, it is desirable that the ionization accelerating agent I adheres to apart of gaps between the projections 220 of the micro metal bodies 200 adjacent to each other, as illustrated in FIG. 6B.

The ionization accelerating agent I accelerates ionization of the analyte by providing ions and energy to the analyte when the ionization accelerating agent I is irradiated with the measurement light L1. The ionization accelerating agent I is not particularly limited as long as it has such a function. It is desirable that a substance that does not generate a disturbance peak, which lowers the sensitivity of detection of the analyte Ri, is used as the ionization accelerating agent I. When the analyte is a biomolecule, a synthetic high polymer (macromolecule), or the like, it is desirable that the ionization accelerating agent I is an organic silicon compound, such as bis (tridecafluoro-1,1,2,2-tetrahydrooctyl)tetramethyl-disiloxane, 1,3-dioctyltetramethyldisiloxane, 1,3-bis(hydroxybutyl)tetramethyldisiloxane, and 1,3-bis(3-carboxypropyl)tetramethyldisiloxan, which are described in T. R. Northen et al., "Clathrate Nanostructures for Mass Spectrometry", Nature, Vol. 449, 1033-1037, Supplementary Information, pp. 1-24, 2007. Other examples of the ionization accelerating agent are carbon nanotubes, matrices, fullerenes, and the like.

Further, a matrix material, such as nicotinic acid, picolinic acid, 3-hydroxypicolinic acid, 3-aminopicolinic acid, 2,5-dihydroxybenzoic acid, α-cyano-4-hydroxycinamic acid, sinapinic acid (sinapic acid), 2-(4-hydroxyphenylazo) benzoic acid, 2-mercaptobenzothiazole, 5-chloro-2-mercaptobenzothiazole, 2,6-dihydroxyacetophenone, 2,4,6-trihydroxyacetophenone, dithranol, benzo[a]pyrene, 9-nitroanthracene, and 2-[(2E)-3-(4-tret-butylphenyl)-2-methylprop-2-enylidene]malononitrile, which is used in the MALDI method may be used as the ionization accelerating agent I.

The ionization accelerating agent I may be one kind of compound. Alternatively, a mixture or a layered body of at least two kinds of compounds may be used as the ionization accelerating agent I.

As described above, the SALDI substrate 10 (10') includes the microstructure 300a and the ionization accelerating agent I adhering to at least a part of the surface 300s of the microstructure 300a. The microstructure 300a has a plurality of metal bodies 200 the size of which can induce localized plasmons by irradiation with the measurement light L1. The plurality of metal bodies 200 are provided on a surface 100s of the substrate 100. When the sample S in contact with the SALDI substrate 10 (10') is irradiated with the measurement light L1, localized plasmons are induced at the plurality of metal bodies 200 in the SALDI substrate 10 (10'), and an enhanced electric field is generated on the surface of the SALDI substrate 10 (10'). At the same time, the ionization accelerating agent I is excited. Therefore, the energy of the measurement light L1 that has increased in the enhanced electric field, and protons, ions, an energy and the like that have been given by the ionization accelerating agent I can highly efficiently ionize the analyte R, and desorb the analyte R from the surface 10s.

When the SALDI substrate as described above is used in the mass spectrometry apparatus 1 of the above embodiment, a so-called hot spot is obtained by the arrangement in which the enhanced electric field effect by the metal probe 22 (metal microparticle 23) and the enhanced electric field effect by the SALDI substrate are enhanced each other. The hot spot is an extremely highly enhanced electric field. Therefore, the hot spot, which is the extremely highly enhanced electric field, can increase not only the energy of the measurement light L1 but the excitation efficiency of the ionization accelerating agent I simultaneously. Further, the synergistic effect of these effects can greatly improve the ionization efficiency, and effectively increase the absolute intensity of signals to be detected.

When the mass spectrometry apparatus 1 and the SALDI substrate 10 (10') of the above embodiment are used in surface-assisted laser desorption/ionization mass spectrometry, it is possible to reduce the power of the measurement light L1. Therefore, even if the analyte R is a substance that is hard to evaporate or a high molecular weight substance, highly sensitive mass spectrometry is possible without causing fragmentation and denaturation of the analyte R, and a deformation of the substrate per se.

As described in the section of "Description of the Related Art", it was necessary to adopt the MALDI method to carry out mass spectrometry on a substance that is hard to evaporate or a high molecular weight substance without causing any chemical change on the substance (analyte). Since the chemical structure of such a substance is complex, it was necessary to optimize, based on the chemical properties of the analyte, the method for preparing a mixed crystal of a matrix material and a sample. Consequently, the process became complicated. However, when the mass spectrometry 1 and the SALDI substrate 10 (10') of the above embodiment are used, mass spectrometry with high spatial resolution and high sensitivity can be carried out on a substance that is hard to evaporate and a high molecular weight substance by the surface-assisted laser desorption/ionization mass spectrometry without causing fragmentation and denaturation of the analyte R and a deformation of the substrate per se. In the surface-assisted laser desorption/ionization mass spectrometry, the sample may be prepared merely by applying or mounting a sample solution onto the sample contact surface of the SALDI substrate. Therefore, the present invention can carry out highly sensitive mass spectrometry on a substance that is hard to evaporate and a high molecular weight substance by using a simple method without causing fragmentation and denaturation of the analyte R, and a deformation of the substrate per se.

Second Embodiment of Substrate for Mass Spectrometry (SALDI Substrate)

With reference to FIGS. 8A and 8B, a SALDI substrate 20 (20') according to the second embodiment of the present invention will be described. FIG. 8A is a cross-sectional diagram of the SALDI substrate 20 in the thickness direction of the substrate. FIG. 8B is a cross-sectional diagram of the SALDI substrate 20' in the thickness direction of the substrate. In FIGS. 8A and 8B, each element is appropriately illustrated in a different scale from an actual size thereof so that they are easily recognized.

As illustrated in FIGS. 8A and 8B, in the SALDI substrate 20 (20'), the manner of loading in formation of the micro metal body 200 differs from the device (substrate) 10 (10') for mass spectrometry of the first embodiment. Consequently, the manner of causing the ionization accelerating agent I to adhere to the surface also differs from the first embodiment.

In the SALDI substrate 20 (20'), the microstructure 300b is formed in a manner similar to the first embodiment. Specifically, the SALDI substrate 20 (20') includes a substrate 100 and a plurality of metal bodies 200, which are loaded into the bottoms of a plurality of micropores 110a in the substrate 100. In the substrate 100, a dielectric 110 is formed on a conductor 120, and the multiplicity of micropores 110a that have substantially the same form when viewed in a plan view direction are substantially regularly arranged. The multiplicity of micropores 110a have openings on the surface 110s of the dielectric 110.

Since the substrate 100 is similar to the substrate of the first embodiment, descriptions on the appropriate material and form of the substrate 100 and the method for producing the substrate 100 are omitted. Further, an appropriate material for the ionization accelerating agent I is similar to the first embodiment.

In the second embodiment, only the manner of loading the micro metal bodies 200 differs from the first embodiment. Therefore, appropriate conditions and the like other than the manner of loading the micro metal bodies 200 are similar to those of the first embodiment.

In the second embodiment, the method for loading the micro metal bodies 200 is similar to the method of the first embodiment. The micro metal bodies 200 are formed by electroplating the micropores 110*a* formed in the dielectric 110. In the present embodiment, when the microstructure 300*b* is formed, the process of loading metal by plating or the like is stopped in the state illustrated in FIG. 7C. Further, the ionization accelerating agent I is caused to adhere to at least a part of the surface 300*s* of the microstructure 300*b* in a manner similar to the first embodiment to obtain the SALDI substrate 20 (FIG. 8A).

Alternatively, the micro metal bodies 200 may easily be loaded by the following method. Specifically, the composition metal of the micro metal bodies 200 are deposited until the micro metal bodies 200 the size of which can induce localized plasmons are formed at the bottoms of the micropores 110*a*. Further, a layer of the composition element of the micro metal bodies 200 deposited on the surface 300*s* of the microstructure 300*b* is removed. In this case, the method for forming the micro metal bodies 200 is not limited. For example, a vapor phase growth method, such as a vacuum vapor deposition method, a sputter method, a CVD method, a laser vapor deposition method, and a cluster ion beam method, may be used. The micro metal bodies 200 may be formed at a normal temperature or with heating. Further, the formation temperature is not limited.

In the SALDI substrate 20 illustrated in FIG. 8A, the ionization accelerating agent I adheres only to the inside of the micropores 110*a*. Alternatively, as in the SALDI substrate 20' illustrated in FIG. 8B, the ionization accelerating agent I may adhere also onto the surface 20*s* of the device for mass spectrometry. The both kinds of SALDI substrates 20 and 20' may be produced in a manner similar to the first embodiment. The SALDI substrate 20, illustrated in FIG. 8A, can be obtained by sufficiently removing the ionization accelerating agent I applied to the surface 20*s* so that the ionization accelerating agent I adheres only to the inside of the micropores 110*a*.

When the diameters of the openings of the micropores 110*a* on the surface 20*s* are small, and the applied ionization accelerating agent solution is present only on the surface 20*s* without entering the micropores 110*a* by the surface tension, the ionization accelerating agent I does not adhere to the bottoms nor to the insides of the micropores 110*a*. In that case, the ionization accelerating agent I may adhere only to the surface 20*s* in the embodiment of the present invention.

In the present embodiment, the microstructure 300*b* and the ionization accelerating agent I are provided in a manner similar to the first embodiment. The microstructure 300*b* includes a plurality of metal bodies 200 the size of which can induce localized plasmons by irradiation with the measurement light L1. The plurality of metal bodies 200 are provided on a surface of the substrate 100. The ionization accelerating agent I adheres to at least a part of the surface 300*s* of the microstructure 300*b*. Therefore, the action and the effect of the present embodiment are similar to those of the first embodiment.

Third Embodiment of Substrate for Mass Spectrometry (SALDI Substrate)

With reference to FIGS. 9A, 9B and 10A through 10E, a SALDI substrate 30 (30') of the third embodiment of the present invention will be described. FIG. 9A is a cross-sectional diagram of the SALDI substrate 30 in the thickness direction of the substrate. FIG. 9B is a cross-sectional diagram of the SALDI substrate 30' in the thickness direction of the substrate. FIGS. 10A through 10E are diagrams illustrating the process of producing the SALDI substrate 30. Each element is appropriately illustrated in a different scale from an actual size so that they are easily recognized.

As illustrated in FIGS. 9A, 9B and 10A through 10E, the SALDI substrate 30 (30') differ from the SALDI substrate 20 of the second embodiment in that a metal thinfilm 200*m* is provided on the surface 110*s* of the dielectric 110.

In the SALDI substrate 30, the microstructure 300*c* is formed on the conductor 120 in a manner similar to the first embodiment. A multiplicity of micropores 110*a* that have substantially the same form when viewed in a plan view direction are substantially regularly arranged. The multiplicity of micropores 110*a* have openings on the surface 110*s* of the dielectric 110. Further, a plurality of micro metal bodies 200, the size of which can induce localized plasmons, adhere to the bottoms of the plurality of micropores 110*a*. Further, the semitransparent/semireflective metal thinfilm. 200*m* is provided at the non-opening portion of the surface 110*s* of the dielectric 110.

Since the substrate 100 is similar to the substrate of the first embodiment, descriptions on the appropriate material and form of the substrate 100 and the method for producing the substrate 100 are omitted. Further, an appropriate material for the ionization accelerating agent I is similar to the first embodiment.

Further, the appropriate size and material of the micro metal body 200 loaded into the bottom of the micropore 110*a* is similar to the first embodiment.

The thickness of the semitransparent/semireflective metal thinfilm 200*m*, formed on the surface 110*s* of the dielectric 110, is not particularly limited. It is desirable that the thickness of the metal thinfilm 200*m* can excite localized plasmons by totally reflected light in a resonator, because the substrate 100 and the metal thinfilm 200*m* can form resonator structure. If the localized plasmons are induced, an enhanced electric field is generated on the metal thinfilm. 200*m*, and that is desirable. The material of the metal thinfilm 200*m* is not particularly limited. For example, a material similar to the material of the micro metal body 200 may be used.

Figure 10A:
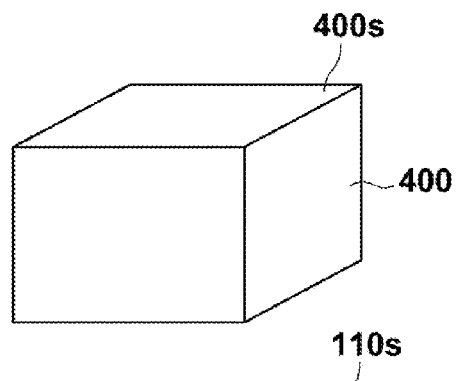
FIG. 10A is a cross-sectional diagram illustrating the process of producing the substrate for mass spectrometry illustrated in FIG. 9A (No. 1)
Figure 10B:
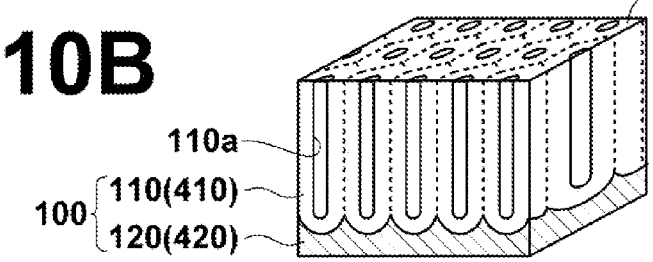
FIG. 10B is a cross-sectional diagram illustrating the process of producing the substrate for mass spectrometry illustrated in FIG. 9A (No. 2)

As illustrated in FIGS. 10A through 10E, the substrate 100 of the present embodiment may be formed by anodic oxidization in a manner similar to the first embodiment and the second embodiment (FIGS. 10A and 10B).

Figure 10C:
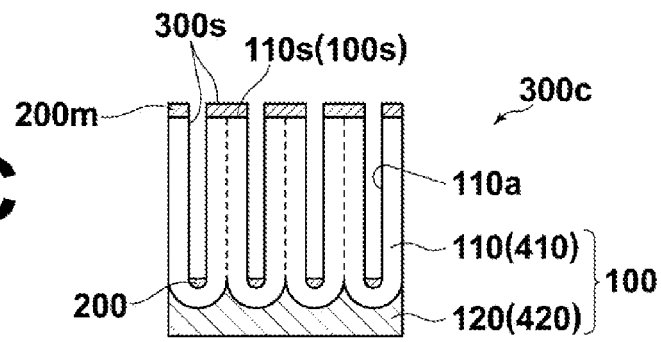
FIG. 10C is a cross-sectional diagram illustrating the process of producing the substrate for mass spectrometry illustrated in FIG. 9A (No. 3)

The method for forming the metal thinfilm 200*m* and the micro metal bodies 200 are not particularly limited. However, it is desirable that the metal thinfilm 200*m* and the micro metal bodies 200 are formed from the upper side of the surface 110*s* of the dielectric, for example, by using a vapor phase growth method, such as a vacuum vapor deposition method, a sputter method, a CVD method, a laser vapor deposition method, and a cluster ion beam method. When the metal thinfilm 200*m* is deposited from the upper side of the surface 110*s* of the dielectric by using the vapor phase growth method, the composition element of the metal thinfilm 200*m* is deposited also on the bottoms of the micropores 110*a*. Therefore, it is possible to form the micro metal bodies 200 and the metal thinfilm 200*m* simultaneously (FIG. 10C). The micro metal bodies 200 and the metal thinfilm 200*m* may be formed at a normal temperature or with heating. Further, the formation temperature is not limited.

Figure 10D:
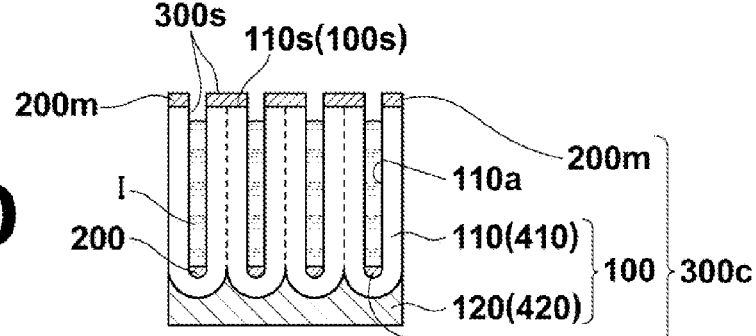
FIG. 10D is a cross-sectional diagram illustrating the process of producing the substrate for mass spectrometry illustrated in FIG. 9A (No. 4)
Figure 10E:
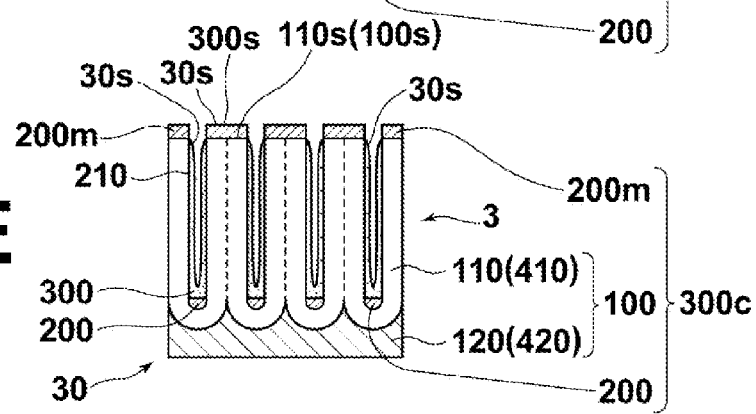
FIG. 10E is a cross-sectional diagram illustrating the process of producing the substrate for mass spectrometry illustrated in FIG. 9A (No. 5)

Further, the ionization accelerating agent I is caused to adhere to at least a part of the surface 300*s* of the microstructure 300*c* to obtain the SALDI substrate 30. The ionization accelerating agent I may be caused to adhere in a manner similar to the first embodiment (FIGS. 10D and 10E).

In the SALDI substrate 30 illustrated in FIG. 9A, the ionization accelerating agent I adheres only to the inside of the micropores 110*a*. Alternatively, the ionization accelerating agent I may adhere also to the surface 30s of a SALDI substrate 30' as illustrated in FIG. 9B. In both of the examples, the SALDI substrates 30 and 30' may be produced by using a method similar to the first embodiment. When the SALDI substrate 30 illustrated in FIG. 9A is produced, the ionization accelerating agent I applied to the surface 30s is sufficiently removed so that the ionization accelerating agent I adheres only to the insides of the micropores 110a.

Further, in a manner similar to the second embodiment, when the diameters of the openings of the micropores 110a on the surface 30s are small, and the applied ionization accelerating agent solution is present only on the surface 30s without entering the micropores 110a by the surface tension, the ionization accelerating agent I does not adhere to the bottoms nor to the insides of the micropores 110a. In that case, the ionization accelerating agent I may adhere only to the surface 30s in the embodiment of the present invention.

In the present embodiment, the microstructure 300c and the ionization accelerating agent I are provided in a manner similar to the first embodiment. The microstructure 300c includes a plurality of metal bodies 200 the size of which can induce localized plasmons by irradiation with the measurement light L1. The plurality of metal bodies 200 are provided on a surface 100s of the substrate 100. The ionization accelerating agent I adheres to at least a part of the surface 300s of the microstructure 300c. Therefore, the action and the effect of the present embodiment are similar to those of the first embodiment.

In the present embodiment, when localized plasmons are induced at the metal thinfilm 200m, an enhanced electric field, the degree of enhancement of which is higher than the enhancement of the field by the micro metal bodies 200, can be generated. Therefore, the energy of the measurement light L1 can be reduced, and that is desirable.

In the above embodiment, a case in which the metal thinfilm 200m is provided at the non-opening portion of the surface 110s of the dielectric in the microstructure 300c was described. Alternatively, micro metal bodies 200, the sizes of which can induce localized plasmons, may be caused to adhere to the non-opening portion of the surface 110s. When the substrate is structured in such a manner, it is possible to generate an electric field enhanced by localized plasmons. In this case, it is desirable that the micro metal bodies 200 adhere to the surface 110s in such a manner that the micro metal bodies 200 adjacent to each other are apart from each other. Optionally, average distance w between the micro metal bodies 200 adjacent to each other may be in the range of a few nanometers (nm) to 10 nm. When the average distance is in the aforementioned range, it is possible to effectively obtain the electric field enhancement effect by the localized plasmons.

The method for causing the micro metal bodies 200 the sizes of which can induce localized plasmons to adhere to the surface 110s is not particularly limited. For example, a metal thinfilm 200m may be deposited onto a non-opening portion of the surface 110s, the non-opening portion in which the micropores 110a are not open (FIG. 10C). Further, thermal processing may be carried out on the metal thinfilm 200m to make the composition metal of the metal thinfilm 200m cohere in particle form. When the thickness of the metal thinfilm 200m is in nano order, it is considered that the composition metal of the metal thinfilm 200 is melted once by thermal process, and particles are formed of the melted metal that naturally coheres onto the surface 110s of the dielectric 110 in temperature dropping process. The thermal process carried out on the metal thinfilm 200m is not limited. For example, anneal methods, such as a laser anneal method, an electronic beam anneal method, a flash lamp anneal method, a thermal radiation anneal method using a heater, and an electric furnace anneal method, may be used.

The temperature of the thermal process is not limited as long as the composition metal of the metal thinfilm 200m coheres. It is desirable that the temperature of the thermal process is higher than or equal the melting point of the metal thinfilm 200m and less than the melting point of the dielectric 110. When the thickness of the metal thinfilm 200m is in nano order, a remarkable melting point drop phenomenon, in which melting starts at a temperature that is much lower than the melting point of bulk metal, occurs. Therefore, if the melting point drop phenomenon is utilized, it is possible to carry out thermal process at a temperature that is higher than the melting point of the metal thinfilm. 200m, and that is lower than the melting point of the dielectric 110.

Besides the method for forming particles by carrying out thermal process on the metal thinfilm 200m after depositing the metal thinfilm 200m onto the surface 110s, a method utilizing metal colloid, an LB method, a silane coupling method, an oblique vapor deposition method, a vapor deposition method using a mask, a method using natural evaporation process after citric acid is replaced by CTAB (H. Wang et al., "Nanosphere Arrays with Controlled Sub-10-nm Gaps as Surface-Enhanced Raman Spectroscopy Substrates", J. Am. Chem. Soc., Vol. 127, pp. 14992-14993, 2005), and the like may be used.

In the first through third embodiments of the SALDI substrates, the alumina layer obtained by anodically oxidizing a portion of the metal body 400 to be anodically oxidized is the dielectric 110, and a non-anodically-oxidized portion of the metal body 400 to be anodically oxidized is the conductor 120. However, it is not necessary that the metal body 400 to be anodically oxidized is oxidized in such a manner. Alternatively, the whole metal body 400 to be anodically oxidized may be anodically oxidized, and the conductor 120 may be formed by a separate process, such as vapor deposition. In such a case, the material of the conductor 120 is not limited, and a conductive material, such as an arbitrary metal and ITO (indium-tin oxide), may be used.

In the above example, only Al was used as the main component of the metal body 400 to be anodically oxidized. However, it is not necessary that the main component is Al, and an arbitrary metal may be used as long as the metal can be anodically oxidized and the metal oxide formed by anodic oxidization of the metal passes light. For example, Si, Ti, Ta, Hf, Zr, In, Zn and the like may be used instead of Al. The metal body 400 to be anodically oxidized may contain two or more kinds of metal that can be anodically oxidized. The pattern of the micropore 120 viewed in a plan view direction differs depending on the kind of the metal to be anodically oxidized. Still, a dielectric 110 in which micropores 120 that have substantially the same form when viewed in a plan view direction are arranged next to each other is formed from the metal to be anodically oxidized.

So far, cases of regularly arranging the micropores 110a by anodic oxidation have been described. However, the method for forming the micropores 110a is not limited to anodic oxidization. It is desirable to use anodic oxidization as in the above embodiment, because the anodic oxidization can process the entire surface in one process, and cope with an increase in the area of the substance to be processed, and does not require an expensive device for processing. Alternatively, other micro processing techniques may be used instead of anodic oxidization. For example, a plurality of regularly arranged recesses may be formed on a surface of a substrate, such as a resin, by nanoimprinting techniques. Alternatively, a plurality of regularly arranged recesses may be drawn on a surface of a substrate, such as metal, by using an electronic drawing technique, such as a focused ion beam (FIB), and an electronic beam (EB), or the like. Further, the micropores 12 may be regularly arranged, or irregularly arranged.

So far, cases of providing the conductor 120 on the back side 110r of the dielectric 110 have been described. However, when a method, such as an electric plating method, which needs electrodes is not used as a method for loading the metal bodies 200 into the micropores 110a, it is not necessary that the conductor 120 is provided. Further, after formation of the metal body 200, the conductor 120 may be removed.

EXAMPLES

Examples of the present invention will be described.

Example 1

A SALDI substrate was produced through the following procedure.

An aluminum plate (Al purity is 99.99%, and the thickness of the plate is 10 mm) was prepared as a metal body to be anodically oxidized. This aluminum plate was used as an anode, and aluminum was used as a cathode, and anodic oxidization was carried out to produce a microporous substrate. The average diameter of micropores on the obtained substrate was 50 nm, and average pitch P of the micropores was approximately 100 nm. The liquid temperature during anodic oxidization was 15° C., and other reaction conditions were as follows:

Reaction Conditions
0.5 M oxalic acid, as electrolytic solution;
application voltage of 40V; and
reaction time of 5 hours.

Next, a non-anodically-oxidized portion was used as an electrode, and Au plating was carried out to deposit Au from the bottoms of the micropores and to make Au overflow from the micropores to the surface of the substrate. Accordingly, microstructures in which stem portions of the mushroom-shaped micro metal bodies are loaded into the insides of the micropores were produced. At this time, the time period of plating was adjusted so that the head portions of the mushroom-shaped micro metal bodies were apart from each other by approximately 10 nm.

Next, a solution of bis(tridecafluorotetrahydrooctyl)tetramethyl-disiloxane was prepared as an ionization accelerating agent. Further, the ionization accelerating agent was caused to adhere to the surface of the micro structure to obtain the substrate for mass spectrometry of the present invention. The ionization accelerating agent was caused to adhere to the surface by repeating, a few times, the process of applying the ionization accelerating agent to the surface, drying the applied ionization accelerating agent, and removing an excessive portion of the applied ionization accelerating agent. In this process, the step of drying was carried out by thermal process in an oven at 120° C. for 50 seconds, and the step of removing the excessive portion was carried out by using a nitrogen gun.

The obtained SALDI substrate was fixed to the substrate holding means of the mass spectrometry apparatus illustrated in FIG. 1, and a section of a mouse liver cell was mounted on the SALDI substrate. Further, a metal probe obtained by depositing, by oblique vapor deposition, a layer of gold (Au) with a thickness of 5 nm at the leading end (made of SUS) of the metal probe that has a diameter of 10 nm (at the leading end thereof) and by annealing the layer of gold at 500° C. for 20 minutes in a furnace was used. The oblique vapor deposition was carried out in a state in which the metal probe was inclined by 80 degrees. Further, the mass spectrometry apparatus was structured so that a distance from the sample to be measured is drive-controllable, and mass spectrometry was carried out. The measurement conditions were as follows:

wavelength of measurement light (laser): 337 nm
(VSL-337, produced by Spectra-Physics);
intensity of measurement light: 2 μJ;
measurement mode: linear mode; and
ion mode; cation mode.

Figure 11A:
FIG. 11A is a diagram illustrating a mass spectrum when a mass spectrometry apparatus of the present invention is used in Example 1.

FIG. 11A is a diagram illustrating a mass spectrum when mass spectrometry was carried out on a normal portion (region) of a mouse liver cell. As illustrated in FIG. 11A, it was confirmed that even if the intensity of the measurement light is 2 μJ, which is low power, extremely highly sensitive detection is possible.

When similar measurement was carried out without using the SALDI substrate as the substrate and by using an ordinary AFM probe that does not include a metal particle at the leading end thereof, it was impossible to carry out mass spectrometry. Therefore, a result of mass spectrometry obtained when the intensity of measurement light was increased to 20 μJ is illustrated in FIG. 11B.

Figure 11B:
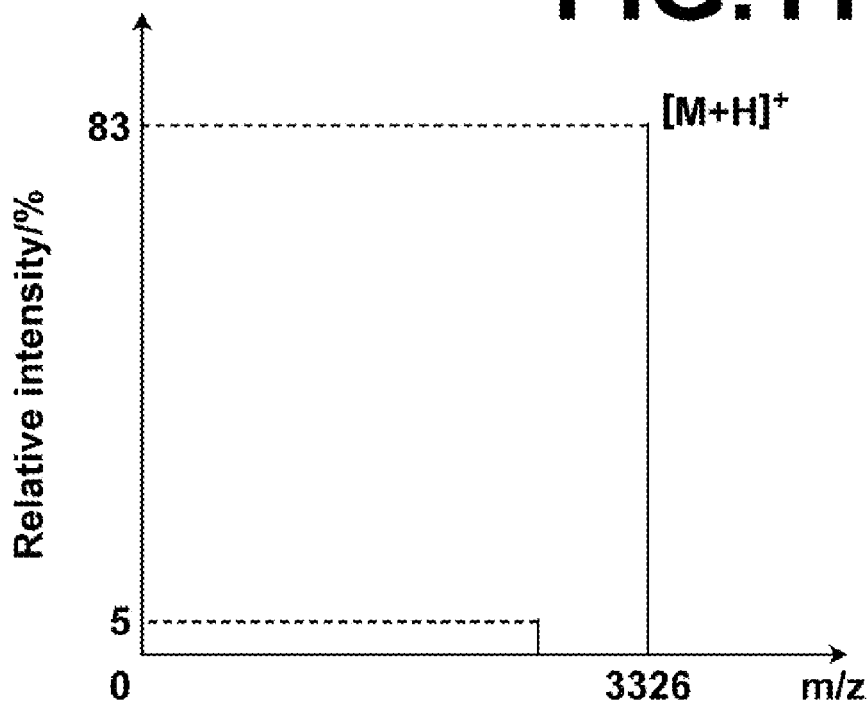
FIG. 11B is a diagram illustrating a mass spectrum when a mass spectrometry apparatus of a comparative example is used.

When FIGS. 11A and 11B are compared with each other, it is confirmed that the mass spectrometry apparatus of the present invention can achieve more highly sensitive analysis using measurement light the power (intensity) of which is 1/10 of ordinary measurement light.

The present invention may be applied to a mass spectrometry apparatus, which is used to identify a substance or the like.

What is claimed is:

1. A mass spectrometry apparatus comprising:
a substrate for mass spectrometry that is used in surface-assisted laser desorption/ionization mass spectrometry;
a light irradiation means that irradiates a sample that is in contact with a surface of the substrate for mass spectrometry with measurement light to desorb an analyte contained in the sample from the surface of the substrate for mass spectrometry;
a metal probe that generates near-field light at the leading end thereof by irradiation with the measurement light;
a detector that detects the desorbed analyte; and
an analysis means that performs mass spectrometry on the analyte based on a detection result by the detector, wherein the leading end of the metal probe is arranged in such a manner that the near-field light generated by irradiation with the measurement light is in contact with a measurement light irradiation portion of the sample, and when the angle formed between a line that perpendicularly connects the sample surface and the detector and a line that connects a laser beam irradiation position and two ends of a grid provided before a laser beam enters the detector is designated as α, and when the minimum angle formed between the line that perpendicularly connects the sample surface and the detector and a line that connects the leading end and a base portion of the metal probe is designated as β, the positional relationship α<β is established;
wherein the metal probe includes a metal microparticle that is capable of inducing localized plasmons at the leading end thereof; and
wherein the maximum diameter of the leading end is less than or equal to the wavelength of the measuring light.

2. A mass spectrometry apparatus, as defined in claim 1, wherein the metal microparticle essentially contains at least one kind of metal element selected from the group consisting of Au, Ag, Cu, Al, Pt, Ni and Ti.

3. A mass spectrometry apparatus, as defined in claim 1, further comprising:
a position control unit that relatively changes the position of the leading end of the metal probe and an irradiation position of the measurement light along XY direction, which is an in-plane direction of the substrate for mass spectrometry on which the sample is mounted.

4. A mass spectrometry apparatus, as defined in claim 3, further comprising:
an XY direction position sensor that detects the position of the metal probe with respect to XY direction; and
a display unit that displays the position of the metal probe with respect to XY direction detected by the XY direction position sensor and a result of mass spectrometry by the analysis means with the metal probe located at the position with respect to XY direction, associating them with each other.

5. A mass spectrometry apparatus, as defined in claim 1, wherein the substrate for mass spectrometry has, on a surface thereof, a microstructure having a plurality of metal bodies the sizes of which can induce localized plasmons by irradiation with the measurement light and an ionization accelerating agent adhering to at least a part of a surface of the microstructure.

6. A mass spectrometry apparatus, as defined in claim 1, wherein the substrate for mass spectrometry has, on a surface thereof, a microstructure having a plurality of metal bodies the sizes of which can induce localized plasmons by irradiation with the measurement light and an ionization accelerating agent adhering to at least a part of a surface of the microstructure.

7. A mass spectrometry apparatus, as defined in claim 5, wherein the substrate for mass spectrometry includes a dielectric having a plurality of micropores with closed bottoms that have openings on the surface of the substrate for mass spectrometry, and wherein in the microstructure, the plurality of metal bodies adhere to at least the closed bottoms of the plurality of micropores and/or to at least a part of a non-opening portion of the surface of the substrate for mass spectrometry, the non-opening portion not having the openings of the micropores.

8. A mass spectrometry apparatus, as defined in claim 6, wherein the substrate for mass spectrometry includes a dielectric having a plurality of micropores with closed bottoms that have openings on the surface of the substrate for mass spectrometry, and wherein in the microstructure, the plurality of metal bodies adhere to at least the closed bottoms of the plurality of micropores and/or to at least a part of a non-opening portion of the surface of the substrate for mass spectrometry, the non-opening portion not having the openings of the micropores.

9. A mass spectrometry apparatus, as defined in claim 5, wherein the substrate for mass spectrometry includes a dielectric having a plurality of micropores with closed bottoms that have openings on the surface of the substrate for mass spectrometry, and wherein in the microstructure, the plurality of metal bodies include loading portions, which are loaded into the plurality of micropores, and projection portions that are formed on the loading portions respectively so as to project from the surface of the substrate for mass spectrometry, the maximum diameter of each of the projection portions in a direction parallel to the surface of the substrate for mass spectrometry being greater than the diameters of respective loading portions in the direction parallel to the surface of the substrate for mass spectrometry, and wherein at least a part of the projection portions of the plurality of metal bodies are apart from each other.

10. A mass spectrometry apparatus, as defined in claim 6, wherein the substrate for mass spectrometry includes a dielectric having a plurality of micropores with closed bottoms that have openings on the surface of the substrate for mass spectrometry, and wherein in the microstructure, the plurality of metal bodies include loading portions, which are loaded into the plurality of micropores, and projection portions that are formed on the loading portions respectively so as to project from the surface of the substrate for mass spectrometry, the maximum diameter of each of the projection portions in a direction parallel to the surface of the substrate for mass spectrometry being greater than the diameters of respective loading portions in the direction parallel to the surface of the substrate for mass spectrometry, and wherein at least a part of the projection portions of the plurality of metal bodies are apart from each other.

11. A mass spectrometry apparatus, as defined in claim 9, wherein an average distance between the projection portions adjacent to each other is less than or equal to 10 nm.

12. A mass spectrometry apparatus, as defined in claim 10, wherein an average distance between the projection portions adjacent to each other is less than or equal to 10 nm.

13. A mass spectrometry apparatus, as defined in claim 5, wherein the ionization accelerating agent is an organic silicon compound.

14. A mass spectrometry apparatus, as defined in claim 1, wherein the mass spectrometry apparatus is a time-of-flight mass spectrometry apparatus including a flight direction control means provided between the substrate for mass spectrometry and the detector, and wherein the flight direction control means controls the direction of flight of the desorbed analyte and directs the desorbed analyte to a detection surface of the detector.

15. A mass spectrometry method using the mass spectrometry apparatus, as defined in claim 1, the method comprising the steps of:
irradiating a measurement portion of the sample and the leading end of the metal probe with the measurement light after the sample is placed in contact with the surface of the substrate for mass spectrometry;
desorbing the analyte contained in the sample from the surface of the substrate for mass spectrometry by the measurement light having energy enhanced by an enhanced electric field by near-field light generated at the leading end of the metal probe by irradiation with the measurement light and by an enhanced electric field induced by a surface-assisting structure on the surface of the substrate for mass spectrometry; and
capturing the desorbed analyte to perform mass spectrometry.

* * * * *